(12) United States Patent
Raesig et al.

(10) Patent No.: US 9,049,496 B2
(45) Date of Patent: Jun. 2, 2015

(54) MEDIA SOURCE IDENTIFICATION

(75) Inventors: Tassilo Raesig, Landshut (DE); Frank Heider, Germering (DE); Dietmar Krauss, Munich (DE)

(73) Assignee: Gracenote, Inc., Emeryville, CA (US)

( * ) Notice: Subject to any disclaimer, the term of this patent is extended or adjusted under 35 U.S.C. 154(b) by 591 days.

(21) Appl. No.: 13/224,172

(22) Filed: Sep. 1, 2011

(65) Prior Publication Data
US 2013/0058522 A1    Mar. 7, 2013

(51) Int. Cl.
| | | |
|---|---|---|
| H04H 60/32 | (2008.01) | |
| H04N 7/16 | (2011.01) | |
| H04N 7/173 | (2011.01) | |
| H04N 21/8352 | (2011.01) | |
| H04N 21/422 | (2011.01) | |
| H04N 21/439 | (2011.01) | |
| H04N 21/44 | (2011.01) | |
| G06F 17/30 | (2006.01) | |

(52) U.S. Cl.
CPC ..... *H04N 21/8352* (2013.01); *H04N 21/42204* (2013.01); *H04N 21/4394* (2013.01); *H04N 21/44008* (2013.01); *G06F 17/30026* (2013.01); *G06F 17/30047* (2013.01)

(58) Field of Classification Search
USPC ................................................. 725/74–104
See application file for complete search history.

(56) References Cited

U.S. PATENT DOCUMENTS

| | | | |
|---|---|---|---|
| 5,973,750 A * | 10/1999 | Ogawa et al. ................. 348/570 |
| 6,567,978 B1 * | 5/2003 | Jarrell ............................ 725/14 |
| 6,990,453 B2 * | 1/2006 | Wang et al. .................... 704/270 |
| 7,346,512 B2 * | 3/2008 | Li-Chun Wang et al. ..... 704/270 |
| 7,359,889 B2 * | 4/2008 | Wang et al. .................... 707/661 |
| 7,627,477 B2 * | 12/2009 | Wang et al. .................... 704/273 |
| 7,853,664 B1 * | 12/2010 | Wang et al. .................... 709/217 |
| 8,732,738 B2 * | 5/2014 | Lu et al. .......................... 725/18 |
| 2004/0066308 A1 * | 4/2004 | Sampsell ................. 340/825.69 |
| 2005/0024185 A1 * | 2/2005 | Chuey .......................... 340/5.71 |
| 2007/0041667 A1 | 2/2007 | Cox |

(Continued)

FOREIGN PATENT DOCUMENTS

| | | |
|---|---|---|
| WO | WO-2005079499 A2 | 9/2005 |
| WO | WO-2013032787 A1 | 3/2013 |

OTHER PUBLICATIONS

"International Application Serial No. PCT/US2012/051745, International Search Report mailed Jan. 10, 2013", 5 pgs.

(Continued)

*Primary Examiner* — Mushfik Alam
(74) *Attorney, Agent, or Firm* — Schwegman Lundberg & Woessner, P.A.

(57) ABSTRACT

A server machine and a first device (e.g., a television) are configured to access a stream of media (e.g., a broadcast channel) from a media source (e.g., a broadcaster). The server machine generates a representation (e.g., a fingerprint) of the stream of media and stores the representation. The first device plays the stream of media (e.g., for a user) and generates an analog signal based on the stream of media. A second device (e.g., a mobile device of the user) is configured to receive the analog signal and generate a representation of the analog signal. The second device provides the representation of the analog signal to the server machine, which may compare the representation of the stream of media to the representation of the analog signal. Based on the comparison, the server machine may provide an identifier of the media source to the second device.

21 Claims, 11 Drawing Sheets

(56) References Cited

U.S. PATENT DOCUMENTS

| | | |
|---|---|---|
| 2007/0061838 A1* | 3/2007 | Grubbs et al. .................. 725/35 |
| 2007/0143777 A1* | 6/2007 | Wang .............................. 725/18 |
| 2008/0091366 A1* | 4/2008 | Wang .............................. 702/71 |
| 2008/0154401 A1* | 6/2008 | Wang .............................. 700/94 |
| 2008/0208851 A1* | 8/2008 | Briggs et al. ...................... 707/6 |
| 2009/0055854 A1* | 2/2009 | Wright et al. .................... 725/14 |
| 2009/0271829 A1 | 10/2009 | Larsson et al. |
| 2010/0156694 A1* | 6/2010 | Rye et al. ...................... 341/176 |
| 2011/0122255 A1* | 5/2011 | Haritaoglu .................... 348/180 |
| 2011/0244784 A1* | 10/2011 | Wang .......................... 455/2.01 |
| 2012/0054808 A1* | 3/2012 | Nijim ............................. 725/88 |
| 2012/0133841 A1* | 5/2012 | Vanderhoff et al. .......... 348/734 |
| 2013/0007790 A1* | 1/2013 | McMillan ....................... 725/14 |
| 2013/0136455 A1* | 5/2013 | De Buysscher et al. ...... 398/106 |
| 2013/0339996 A1* | 12/2013 | Davis et al. .................... 725/31 |

OTHER PUBLICATIONS

"International Application Serial No. PCT/US2012/051745, Invitation to Pay Additional Fees mailed Nov. 19, 2012", 7 pgs.

"International Application Serial No. PCT/US2012/051745, Written Opinion mailed Jan. 10, 2013", 8 pgs.

"International Application Serial No. PCT/US2012/051745, Written Opinion mailed Sep. 11, 2013", 4 pgs.

"International Application Serial No. PCT/US2012/051745, International Preliminary Report on Patentability mailed Dec. 9, 2013", 21 pgs.

* cited by examiner

MEDIA SOURCE IDENTIFICATION

TECHNICAL FIELD

The subject matter disclosed herein generally relates to the processing of data. Specifically, the present disclosure addresses systems and methods to identify one or more media sources.

BACKGROUND

A device may be used to present (e.g., play) a stream of media (e.g., a media stream), in whole or in part, to one or more users of the device. A stream of media may be transmitted (e.g., broadcast, multicast, or unicast) from a source of the stream of media (e.g., a media source) to the device, and the device may play some or all of the stream of media. The stream of media may be transmitted in real-time or time-shifted (e.g., buffered), in digital or analog form, from its media source to the device, and this transmission may be via one or more networks (e.g., wireless or wired) that enable communication from the media source to the device. Examples of media sources include a broadcaster (e.g., CNN®), a web server (e.g., YouTube®), a peer-to-peer source (e.g., another device), or any suitable combination thereof. Examples of devices include a television (TV), a radio, or any suitable combination thereof.

A stream of media may include time-sensitive (e.g., clocked or otherwise time coded) information that encodes content (e.g., a text feed, a song, a television program, or a movie) of the stream of media. Accordingly, a stream of media may include audio information (e.g., sound or speech), video information (e.g., still images or motion pictures), text information (e.g., subtitles or closed captions), other data (e.g., an additional audio track, an electronic program guide, an advertisement, game information, or electronic payment information), or any suitable combination thereof, that may be played by the device to present the stream of media and some or all of its content.

BRIEF DESCRIPTION OF THE DRAWINGS

Some embodiments are illustrated by way of example and not limitation in the figures of the accompanying drawings.

DETAILED DESCRIPTION

Figure 1:
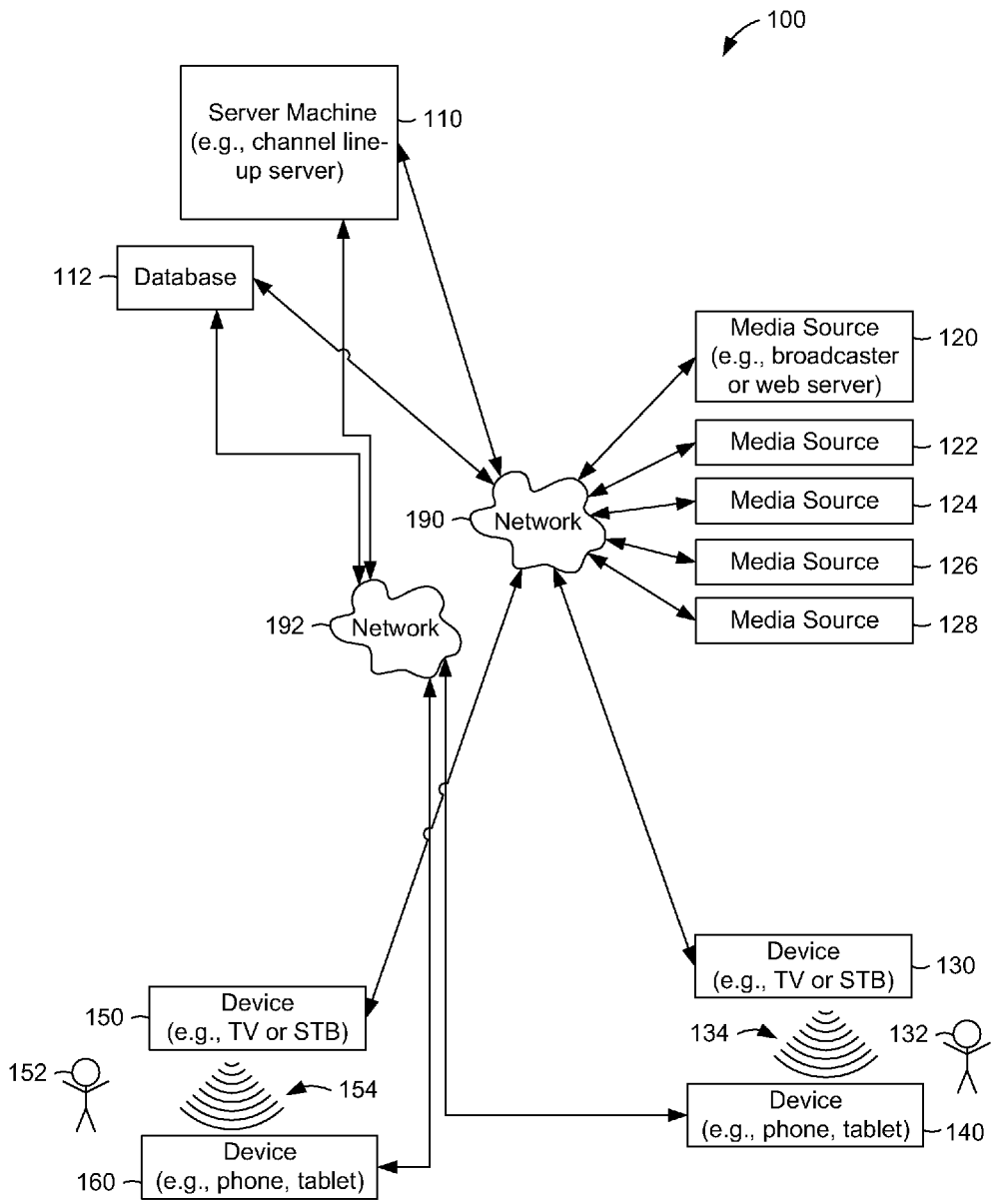
FIG. 1 is a network diagram illustrating a network environment suitable for media source identification, according to some example embodiments.

Example methods and systems are directed to identification of one or more media sources. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A server machine is configured to receive a stream of media from a media source, where the stream of media is also available to a device (e.g., a first device) that is able to play the stream of media. The server machine may generate a representation (e.g., a fingerprint, watermark, or hash value) of the stream of media (e.g., from a portion of the stream of media) and stores this representation (e.g., in a database) as corresponding to the media source (e.g., as corresponding to an identifier of the media source). For example, the server machine may generate a fingerprint of the stream of media and store the fingerprint as corresponding to the media source. As another example, the server machine may generate a watermark, embed the watermark in the stream of media, and store the watermark as corresponding to the media source. The server machine may generate and store representations of multiple media sources for multiple streams of media.

A first device (e.g., a TV) is configured to receive the same stream of media (e.g., the same media content as in the stream of media from the media source), and the first device plays the stream of media (e.g., the media content), which results in the first device providing, for example, an analog signal (e.g., sound or light) to a second device (e.g., a smart phone, tablet computer, or remote control) that is able to receive the analog signal (e.g., by being positioned near the first device or by being connected to the first device). In some example embodiments, the first device provides a digital signal to the second device (e.g., a digital signal that contains no identifier of the media source for the stream of media), and such a digital signal may be used in a manner similar to that described herein for an analog signal.

The second device (e.g., a smart phone) is configured to receive the analog signal from the first device, generate a representation of the analog signal, and provide the representation to the server machine (e.g., via a network). The server machine compares the representation of the analog signal with the representation of the stream of media. Based on this comparison, the server machine may determine that the representation of the analog signal matches (e.g., exactly or within a predetermined tolerance) the representation of the stream of media and accordingly provide an identifier of the media source for the stream of media to the second device.

The second device accesses the identifier of the media source (e.g., by receiving the identifier or by reading the identifier from a database of the server machine) and stores the identifier of the media source (e.g., on the second device) as corresponding to the stream of media (e.g., as being mapped to the stream of media). This may have the effect of enabling the second device to identify the media source from the analog signal, even or especially in situations where the second device is not receiving the stream of media itself.

By identifying one or more media sources whose streams of media are playable (e.g., have been played) by the first device, the second device is able to identify a set of media sources available to the first device (e.g., a channel line-up). In various example embodiments, the second device accesses a list of media sources (e.g., obtaining a complete channel line-up from the server machine), accesses one or more identifiers of media sources from one or more other devices (e.g., peer-to-peer aggregation of partial channel line-ups), or any suitable combination thereof. According to certain example embodiments, the second device detects a further signal (e.g., a channel change signal from a remote control of the first device) that causes the first device to request (e.g., tune-in to) a stream of media and store an identifier of the media source for the stream of media as corresponding to the further signal (e.g., as being mapped to the further signal). The second device may then transmit a copy of the further signal to control the first device.

FIG. 1 is a network diagram illustrating a network environment 100 suitable for media source identification, according to some example embodiments. The network environment 100 includes a server machine 110, a database 112, media sources 120, 122, 124, 126, and 128, and devices 130, 140, 150, and 160, all communicatively coupled to each other via one or more networks (e.g., network 190 and network 192). In some example embodiments, the media sources 120-128 are connected by the network 190 to the server machine 110 and the devices 130 and 150, while the devices 140 and 160 are connected to the server machine 110 by a separate network 192. The server machine 110 and the devices 130, 140, 150, and 160 may each be implemented in a computer system, in whole or in part, as described below with respect to FIG. 11.

The server machine 110 may function as a media source identification server (e.g., a channel line-up server). For example, the server machine 110 may store and maintain one or more lists of media sources (e.g., lists of identifiers of media sources) in the database 112. Moreover, the server machine 110 may store one or more representations (e.g., fingerprints, watermarks, or hash values) in the database 112, or the one or more representations are of a stream of media as corresponding to the media source for the stream of media (e.g., as corresponding to the identifier of the media source). The server machine 110 is an example of a machine (e.g., a computer system) that may perform any one or more of the methodologies described herein and is described as a "server machine" solely for clarity in nomenclature. The server machine 110 need not provide any particular service to any particular client of the server machine 110. The database 112 is a data repository that stores information maintained by the server 110. This information may take the form of one or more representations of one or more streams of media, one or more representations of one or more analog signals (e.g., analog signal 134), or any suitable combination thereof. According to various example embodiments, the database 112 may be directly connected to the server 110, may be included in the server 110, or any suitable combination thereof.

Each of the media sources 120-128 may be a broadcaster (e.g., a server operated by a broadcaster), a web server, a peer-to-peer source (e.g., a device), or any suitable combination thereof. A broadcaster may be a television station or television network (e.g., CNN® or MSNBC®), and the stream of media from such a broadcaster may be a television channel. A web server may be an Internet source of media content (e.g., YouTube®, Hulu®, or Pandora®), and the stream of media from such a web server may be a media channel that includes a video feed, an audio feed, or any suitable combination thereof.

Each of the devices 130 and 150 is able to request, receive, and play all or part of a stream of media (e.g., from media source 120). For example, one or both of the devices 130 and 150 may be a TV, a set-top box (STB) (e.g., a digital tuner or a media decoder), a radio (e.g., a digital radio), or any suitable combination thereof. As a result of playing a stream of media, the device 130 may generate an analog signal 134 that may be received by the device 140. Similarly, in playing a stream of media, the device 150 may generate an analog signal 154 that may be received by the device 160. In receiving a stream of media, each of the devices 130 and 150 may receive a stream of media from a media source (e.g., media source 120), and this reception of the stream of media may be direct or indirect from the media source. Moreover, this reception of the stream of media may be simultaneous or non-simultaneous (e.g., time delayed or buffered) with reception of the same stream of media (e.g., the same media content as in the stream of media) by the server machine 110.

Each of the analog signals 134 and 154 carries media content (e.g., picture information, sound information, text information, or any suitable combination thereof) of a stream of media (e.g., encoded in the stream of media). Accordingly, each of the analog signals 134 and 154 may include a vibration signal (e.g., sound), an electromagnetic signal (e.g., radio, infrared, light, or microwave), or any suitable combination thereof. For example, an analog signal (e.g., analog signal 134) may include an acoustic waveform that represents sound (e.g., generated by a speaker of a device in playing a stream of media). As another example, an analog signal may include an optical pattern of light (e.g., generated by a display of a device in playing a stream of media). The analog signals 134 and 154 each may be devoid of any identifier of a media source for the stream of media. As noted above, according to various example embodiments, where an analog signal (e.g., analog signal 134) is discussed herein, a digital signal may be used instead (e.g., pulse code modulation (PCM), MPEG-1 Layer 3 (mp3), MPEG-2, or other digitally encoded signals that may be transmitted through one or more digital interfaces, such as High-Definition Multimedia Interface (HDMI)).

Each of the devices 140 and 160 is able to receive an analog signal, generate a representation (e.g., a fingerprint, watermark, or a hash value) of that analog signal, and provide the generated representation to the server machine 110. Accordingly, the device 140 may be positioned near the source of the analog signal 134 (e.g., device 130), and the device 160 may be positioned near the source of the analog signal 154 (e.g., device 150). According to some example embodiments, the device 140 may be communicatively coupled (e.g., by a wired or wireless connection) to the device 130, and the device 160 may be communicatively coupled to the device 150. As examples, one or both of the devices 140 and 160 may be a mobile phone (e.g., a smartphone), a personal computer (e.g., a laptop computer, a notebook computer, or a tablet computer), a game controller, a remote control (e.g., a universal remote control usable to control multiple devices), or any suitable combination thereof. As shown, the device 140 may receive the analog signal 134, and the device 160 may receive the analog signal 154. As noted above, according to various example embodiments, one or both of the devices 140 and 160 is able to receive a digital signal (e.g., a digital signal that contains no identifier of the media source for the stream of media from which the digital signal is generated), generate a representation of that digital signal, and provide the generated representation to the server machine 110. For example, the device 140 may be a TV, and the device 130 may be a STB that communicates (e.g., via HDMI) with this TV.

Also shown in FIG. 1 are users 132 and 152. One or both of the users 132 and 152 may be a human user (e.g., a human being), a machine user (e.g., a software program configured to interact with the device 130), or any suitable combination thereof (e.g., a human assisted by a machine or a machine supervised by a human). The user 132 is not part of the network environment 100, but is associated with the device 130 and may be a user of the device 130. Similarly, the user 132 is associated with the device 140 and may be a user of the device 140. For example, the device 130 may be TV or radio of the user 132, and the device 140 may be a tablet computer or a smart phone belonging to the user 132. Similarly, the user 152 is not part of the network environment 100, but is associated with the device 150. Similarly, the user 152 is associated with the device 160 and may be a user of the device 160. As an example, the device 150 may be a TV or radio of the user 152, and the device 160 may be a tablet computer or a smart phone belonging to the user 152.

Any of the machines, databases, or devices shown in FIG. 1 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 11. As used herein, a "database" is a data storage resource and may store data structured as a text file, a table, a spreadsheet, a relational database, a triple store, or any suitable combination thereof. Moreover, any two or more of the machines illustrated in FIG. 1 may be combined into a single machine, and the functions described herein for any single machine may be subdivided among multiple machines.

The network 190 may be any network that enables communication between machines (e.g., server machine 110 and the device 130). Accordingly, the network 190 may be a wired network, a wireless network (e.g., a mobile network), or any suitable combination thereof. The network 190 may include one or more portions that constitute a private network (e.g., a cable television network or a satellite television network), a public network (e.g., over-the-air broadcast channels or the Internet), or any suitable combination thereof. In some example embodiments, the network 190 and the network 192 are connected to each other or are portions of a single network. In various example embodiments, the network 190 is a unidirectional network (e.g., a dedicated media broadcast network) that transmits information from the media sources 120-128 to the server machine 110, the device 130, and the device 150.

The network 192 may be any network that enables communication between machines (e.g., server machine 110 and the device 140), accordingly, the network 192 may be a wired network, a wireless network, or any suitable combination thereof. The network 192 may include one or more portions that constitute a private network, a public network, or any suitable combination thereof. In certain example embodiments, the network 192 is a bidirectional or multidirectional network (e.g., the Internet) that communicates information among the server machine 110, the device 140, and the device 160.

Figure 2:
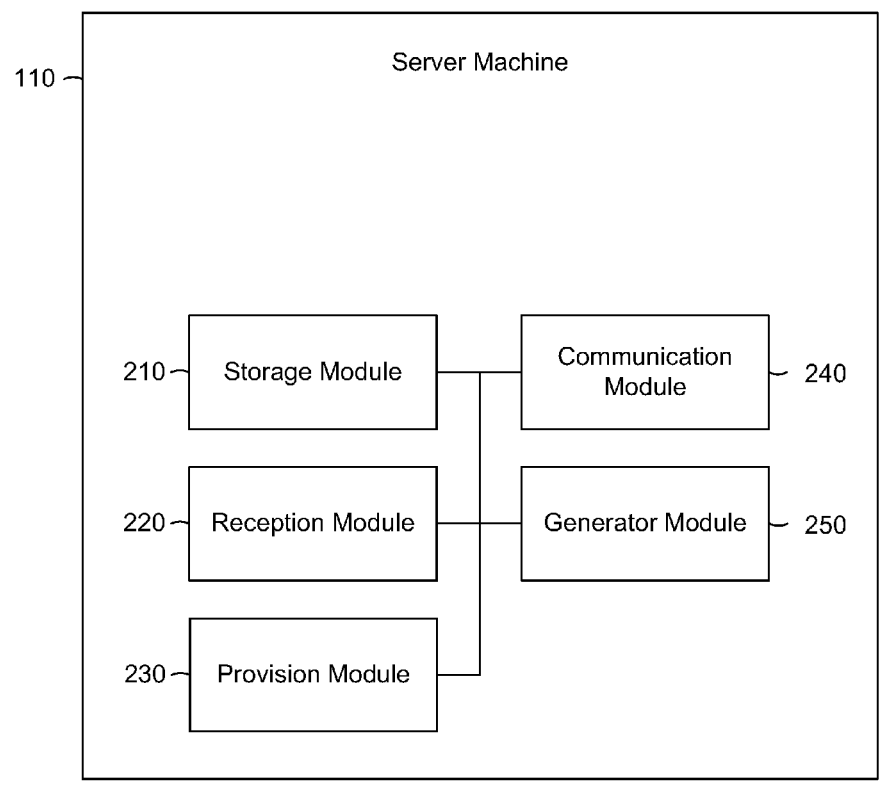
FIG. 2 is a block diagram illustrating components of a server machine suitable for media source identification, according to some example embodiments.

FIG. 2 is a block diagram illustrating components of the server machine 110, according to some example embodiments. The server machine 110 includes a storage module 210, a reception module 220, a provision module 230, a communication module 240, and a generator module 250, all configured to communicate with each other (e.g., via a bus, shared memory, or a switch). Any one or more of the modules described herein may be implemented using hardware (e.g., a processor of a machine) or a combination of hardware and software. Moreover, any two or more of these modules may be combined into a single module, and the functions described herein for a single module may be subdivided among multiple modules.

The storage module 210 is configured to store a representation of the stream of media. For example, the storage module 210 may store a representation of a stream of media that is being received from the media source 120 by the device 130. In some example embodiments, the representation of the stream of media is stored as corresponding to an identifier of the media source 120 from which the stream of media is being received by the device 130. For example, the representation may be mapped to the identifier in a data structure maintained by the storage module 210 in the database 112. In some example embodiments, the storage module 210 stores the representation in the database 112. In certain example embodiments, the storage module 210 stores the representation at the server machine 110 (e.g., in memory, a disk drive, a flash drive, or other data repository within or connected to the server machine 110).

The reception module 220 is configured to receive a representation of an analog signal. For example, the reception module 220 may receive a representation (e.g., a further representation) of the analog signal 134 that is generated as a result of the device 130 playing the stream of media that is being received by the device 130 from the media source 120. In some example embodiments, the reception module 220 receives the further representation of the analog signal 134 from the device 140, where the device 140 generated the further representation of the analog signal 134 (e.g., based on the analog signal 134 being received from the device 130 by the device 140).

The provision module 230 is configured to provide an identifier (e.g., "CNN") of the media source (e.g., CNN®). For example, the provision module 230 may provide the identifier to the device 140 that generated the representation (e.g., the further representation) of the analog signal 134. Moreover, the providing of the identifier may be in response to the receiving of the representation of the analog signal 134. The providing of the identifier may be based on a comparison of the representation of the stream of media with the representation (e.g., the further representation) of the analog signal 134. For example, the provision module 230 may compare the representation of the stream of media with the representation of the analog signal 134 and determine that the representations match (e.g., exactly or within a predetermined threshold of tolerance).

In some example embodiments, the provision module 230 provides the identifier by providing a name (e.g., "CNN") of a broadcaster (e.g., CNN®) that is broadcasting the stream of media to the device 130. In certain example embodiments, the provision module 230 provides the identifier by providing a uniform resource locator (URL) used by the device 130 to request access to the stream of media.

The communication module 240 is configured to receive one or more streams of media from one or more media sources (e.g., media source 120). For example, the communication module 240 may receive the stream of media from the media source 120, while the same stream of media is being received by the device 130.

The generator module 250 is configured to generate a representation (e.g., a fingerprint, a watermark, or a hash value) of one or more streams of media, or portions thereof, received from one or more media sources (e.g., media source 120). For example, the generator module 250 may generate a representation of the stream of media received from the media source 120, while the same stream of media is being received by the device 130.

Moreover, the generator module 250 may generate the representation based on audio information (e.g., sound or speech), video information (e.g., still images or motion pictures), text information (e.g., subtitles or closed captions), other data (e.g., an additional audio channel, an electronic program guide, an advertisement, game information, or electronic payment information), or any suitable combination thereof, that may be included in the stream of media. For example, the generator module 250 may generate the representation (e.g., an audio fingerprint or watermark) based on an acoustic waveform encoded in the stream of media. As another example, the generator module 250 may generate a representation (e.g., a video fingerprint or watermark) based on an optical pattern of light encoded in the stream of media. As a further example, the generator module 250 may generate the representation based on text (e.g., subtitles or closed captioning) encoded in the stream of media.

Figure 3:
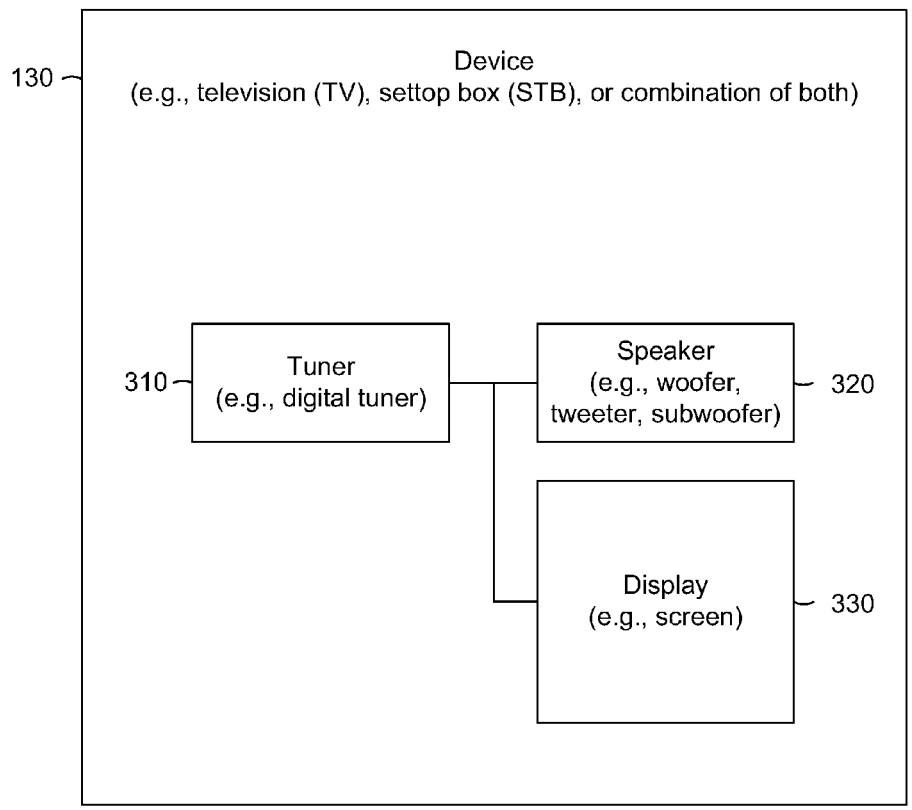
FIG. 3 is a block diagram illustrating components of a device suitable for playing a stream of media, according to some example embodiments.

FIG. 3 is a block diagram illustrating components of the device 130, according to some example embodiments. The device 130 may include one or more of a tuner 310, a speaker 320, and a display 330, all configured to communicate with each other (e.g., via a bus, shared memory, or a switch). Any one or more of these modules may be implemented using hardware (e.g., a processor of a machine) or a combination of hardware and software. Moreover, any two or more of these modules may be combined into a single module, and the functions described herein for a single module may be subdivided among multiple modules.

The tuner 310 is an example of a module that is configured to receive a stream of media (e.g., from the media source 120) and play the stream of media by processing the stream of media and outputting information (e.g., digital or analog) usable by the speaker 320, the display 330, or both, in presenting the stream of media to the user 132. For example, the tuner 310 may output audio information, video information, text information, other data, or any suitable combination thereof in one or more forms that cause the speakers 320 to present sound encoded in the stream of media, and that cause the display 330 to present patterns of light encoded in the stream of media. As examples, the device 330 may be a TV, an STB, a radio (e.g., digital radio), a computer, a tablet, a smart phone, a network home appliance, a networked wristwatch, or any suitable combination thereof.

The speaker 320 is an example of a module that is configured to generate all or part of the analog signal 134 in the form of sound. Accordingly, the speaker 320 may be a woofer, a tweeter, a subwoofer, or any suitable combination thereof. In some example embodiments, the speaker 320 includes a digital-to-analog converter, a decoder module, a decryption module, or any suitable combination thereof. In example embodiments that use a digital signal instead of the analog signal 134, a digital audio interface may be used (e.g., instead of the speaker 320) to communicate all or part of a digital signal (e.g., via a wired or wireless connection to the device 140) that is devoid of any identifier of the media source (e.g., media source 120) of the stream of media received by the tuner 310. As an example, such a digital audio interface may communicate the digital signal using an HDMI connection (e.g., cabled or wireless) to the device 140.

The display 330 is an example of a module that is configured to generate all or part of the analog signal 134 in the form of light (e.g., one or more patterns of light). Accordingly, the display 330 may be a flat-panel screen, a plasma screen, a light emitting diode (LED) screen, a cathode ray tube (CRT), a liquid crystal display (LCD), a projector, or any suitable combination thereof. In certain example embodiments, the display 330 includes a digital-to-analog converter, a decoder module, a decryption module, or any suitable combination thereof. In example embodiments that use a digital signal instead of a analog signal 134, a digital video interface may be used (e.g., instead of the display 330) to communicate all or part of a digital signal (e.g., via a wired or wireless connection to the device 140) that is devoid of any identifier of the media source (e.g., media source 120) of the stream of media received by the tuner 310. As an example, such a digital video interface may communicate the digital signal using an HDMI connection (e.g., cabled or wireless) to the device 140.

In some example embodiments, the speaker 320, the display 330, or both, are located external to the device 130. For example, the device 130 may be an STB having the tuner 310 and one or more modules (e.g., an audio module and a video module) that interface with the speaker 320 and the display 330 (e.g., via cable connections or wireless connections). Accordingly, the speaker 320 may form all or part of an audio presentation system that is external to the device 130 (e.g., a home theater sound system), and the display 330 may form all or part of a visual presentation system that is external to the device 130 (e.g., a flat-panel display or projector). Whether internal or external to the device 130, the speaker 320, the display 330, or both, may be located at a position that enables the device 140 to receive the analog signal 134, which may emanate from the speaker 320, the display 330, or both.

Figure 4:
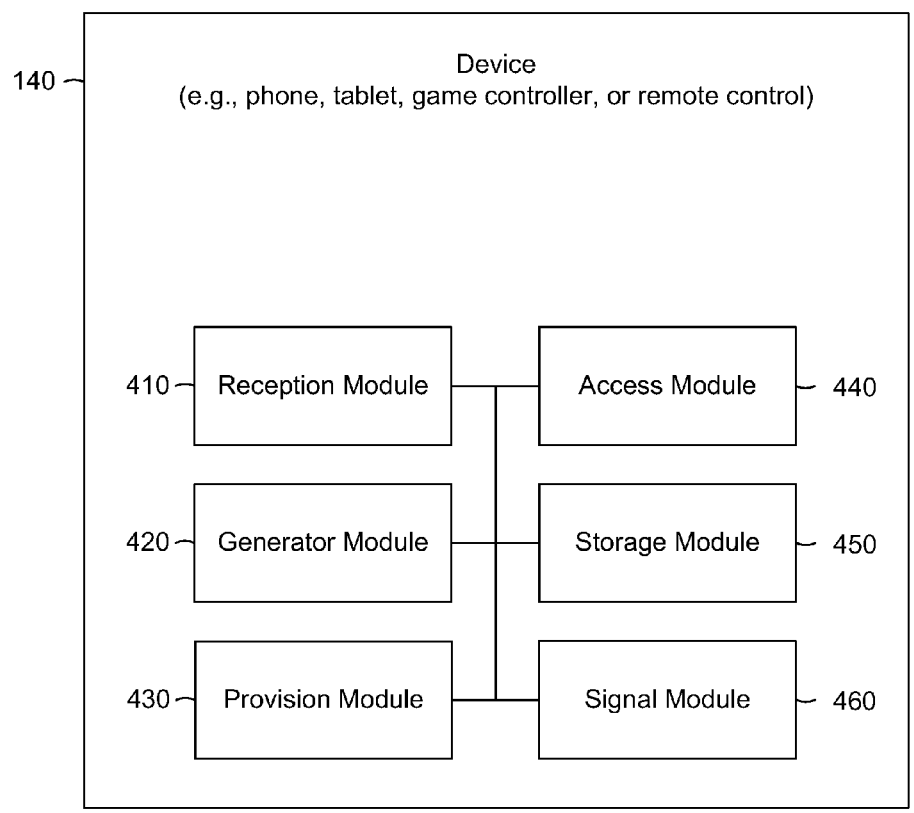
FIG. 4 is a block diagram illustrating components of a device suitable for media source identification, according to some example embodiments.

FIG. 4 is a block diagram illustrating components of the device 140, according to some example embodiments. The device 140 includes a reception module 410, a generator module 420, a provision module 430, the access module 440, a storage module 450, and a signal module 460, all configured to communicate with each other (e.g., via a bus, shared memory, or a switch). Any one or more of these modules may be implemented using hardware (e.g., a processor of a machine) or a combination of hardware and software. Moreover, any two or more of these modules may be combined into a single module, and the functions described herein for a single module may be subdivided among multiple modules. As examples, the device 140 may be a computer (e.g., a notebook computer), a tablet, a smartphone, a game controller, a remote control, a personal digital assistant (PDA), a network home appliance, a networked wristwatch, or any suitable combination thereof.

The reception module 410 is configured to receive the analog signal 134 from the device 130 that generated the analog signal 134 as a result of the device 130 playing a stream of media (e.g., a stream of media being received by the device 130 from the media source 120). For example, the reception module 410 may receive an acoustic waveform included in the analog signal 134. In some example embodiments, the reception module 410 includes a microphone or a software module configured to access data from a microphone of the device 140 (e.g., internal to the device 140 or externally connected to the device 140). As another example, the reception module 410 may receive an optical pattern of light included in the analog signal 134. In certain example embodiments, the reception module 410 includes a camera or a software module configured to access data from a camera of the device 140 (e.g., internal to the device 140 or externally connected to the device 140).

The generator module 420 is configured to generate a representation of an analog signal (e.g., analog signal 134) or a portion thereof. For example, the generator module 420 may generate a representation (e.g., a fingerprint, a watermark, or a hash value) of the analog signal 134 received by the reception module 410.

Moreover, the generator module 420 may generate the representation based on audio information (e.g., sound or speech), video information (e.g., still images or motion pictures), text information (e.g., subtitles or closed captions), other data (e.g., an additional audio channel, an electronic program guide, an advertisement, game information, or electronic payment information), or any suitable combination thereof, that may be included in the analog signal (e.g., analog signal 134). For example, the generator module 420 may generate the representation (e.g., an audio fingerprint or watermark) based on an acoustic waveform included in the analog signal. As another example, the generator module 420 may generate a representation (e.g., a video fingerprint or watermark) based on an optical pattern of light included in the analog signal. As a further example, the generator module 420 may generate the representation based on text (e.g., subtitles or closed captioning) included in the analog signal.

The provision module 430 is configured to provide a representation of an audio signal (e.g., the representation of the analog signal 134 generated by the generator module 420) to the server machine 110. As noted above, the server machine 110 (e.g., via the storage module 210) may store a representation (e.g., a further representation) of a stream of media as corresponding to an identifier of a media source (e.g., media source 120) from which the stream of media is being received by the device 130.

The access module 440 is configured to access (e.g., via the server machine 110) the identifier of the media source (e.g., media source 120) that corresponds to the stream of media that is being received by the device 130. For example, the access module 440 may receive the identifier from the server machine 110 (e.g., communicated via the provision module 230). In some example embodiments, the access module 440 receives an authorization (e.g., communicated by the provision module 230) to access the identifier, and the access module 440 accordingly reads the identifier (e.g., from the server machine 110 or the database 112) based on the authorization. The access module 440 may access the identifier in response to the provision of the representation of the audio signal discussed above with respect to the provision module 430.

In some example embodiments, the access module 440 accesses the identifier by accessing a name (e.g., "CNN") of a broadcaster (e.g., CNN®) that is broadcasting the stream of media to the device 130. In certain example embodiments, the access module 440 accesses the identifier by accessing a URL used by the device 130 to request access to the stream of media.

In some example embodiments, the access module 440 is configured to access multiple identifiers that respectively correspond to multiple media sources (e.g., media sources 120-124). For example, the reception module 410 may receive (e.g., over time) multiple analog signals, and the generator module 420 may generate (e.g., over time) multiple representations of those analog signals, which the provision module 430 (e.g., over time) may provide to the server machine 110. In response to each provision of a representation of an analog signal, the access module 440 may access (e.g., over time) multiple identifiers of multiple media sources. This may have the effect of enabling the storage module 450 to build (e.g., over time) a database of identifiers of these multiple media sources. Moreover, one or more identifiers of media sources may be accessed from the server machine 110, from the database 112, from one or more devices (e.g., device 160, in a peer-to-peer arrangement), or any suitable combination thereof.

The storage module 450 is configured to store the identifier of the media source (e.g., media source 120). For example, the storage module 450 may store the identifier as corresponding (e.g., mapped) to the analog signal 134, to the stream of media being received by the device 130, or both. The storage module 450 may store the identifier within the device 140 (e.g., in memory, a disk drive, a flash drive, or other data repository within the device 140), at a data repository externally connected to the device 140 (e.g., in a cloud storage system), or any suitable combination thereof. According to various example embodiments, the storage module 450 stores the identifier as corresponding (e.g., mapped) to one or more additional signals (e.g., further signals), such as described below with respect to the signal module 460. In some example embodiments, the storage module 450 maps the identifier to the analog signal 134, to the stream of media, to a further signal, or any suitable combination thereof, within a data structure (e.g., a list, table, or database) or a user interface (e.g., an array of icons or logos that represent media sources) stored at the device 140.

In some example embodiments, the storage module 450 is configured to determine that a set of media sources (e.g., media sources 120-128) are available to the device 130 (e.g., are making their respective streams of media available to the device 130). The set of media sources may be referred to as a "channel line-up" (e.g., a list of available media streams) that is available to the device 130. This determination may be based on the identifier of the media source (e.g., media source 120) accessed by the access module 440. Accordingly, the storage module 450 may infer (e.g., in a single operation) or build (e.g., over time) a database of identifiers of media sources that are available to the device 130, based on a partial channel line-up being identified. For example, the media source 120 may be unique to the set of media sources available to the device 130 (e.g., a local cable television station), and the storage module 450 may access a list of identifiers of the media sources in the set (e.g., a channel line-up list) from the server machine 110 (e.g., via the database 112) and determine that the set of media sources (e.g., the channel line-up) is available to the device 130, based on the fact that the identifier of media source 120 was accessed by the access module 440.

As another example, a subset of the media sources (e.g., media sources 120-124) may be unique to the set of media sources available to the device 130 (e.g., a bundle of media sources offered as a special deal to subscribers in the neighborhood of the user 132), and the storage module 450 may access a list of identifiers for the full set of media sources (e.g., from the server machine 110, or from the device 160 located in the same neighborhood of the user 132). As a further example, a group of multiple devices (e.g., devices 140 and 160) that includes the device 140 may be configured as a peer-to-peer network of devices that share information (e.g., representations of analog signals and identifiers of media sources) and build a database of identifiers of multiple media sources (e.g., over time, as identifiers of media sources are accessed from the server machine 110 based on representations of audio signals provided to the server machine 110). Accordingly, the storage module 450 may store multiple identifiers as respectively corresponding to multiple media sources (e.g., media sources 120-128).

The signal module 460 is configured to detect a signal (e.g., a further signal) that, when received by the device 130, causes the device 130 to request a particular stream of media from a particular media source (e.g., media source 120). For example, the device 130 may be partially or fully controlled by a remote control device, and the signal module 460 may detect one or more control signals (e.g., a channel change signal, a channel up signal, a channel down signal, or any suitable combination thereof) being sent from the remote control to the device 130. A control signal may include a channel code (e.g., "channel 008" or "channel 220") that, when received by the device 130, causes the device 130 to change channels to a media source that corresponds to the channel code within a channel line-up (e.g., a channel line-up that is specific to a geographical region of the device 130). As examples, such a control signal may be an infrared (IR) signal, a radio frequency (RF) signal, a Bluetooth signal, a wireless local area network (LAN) signal (e.g., conforming to one or more Institute of Electrical and Electronic Engineers (IEEE) 802.11 standards), an HDMI signal, or any suitable combination thereof.

In some example embodiments, the signal detected by the signal module 430 includes an identifier (e.g., a further identifier) of the media source (e.g., media source 120). For example, the signal module 460, in detecting a channel change signal being sent to cause the device 130 to request the stream of media being broadcast from the media source 120, may detect an alternate (e.g., local or regional) identifier (e.g., "channel 10") of the media source 120 (e.g., CNN®). Such an alternate identifier may identify the media source 120 among multiple media sources (e.g., media sources 120-128) that are available within a particular geographic region (e.g., a building, a neighborhood, a city, a time zone, or a country) of the device 130. The alternate identifier may be stored by the storage module 450 as corresponding to the identifier (e.g., "CNN") accessed by the access module 440.

In certain example embodiments, the signal module 460 is configured to transmit a copy of a signal (e.g., a further signal) that was previously detected by the signal module 460. The signal module 460 may transmit this copy of the signal to the device 130. This may have the effect of enabling the device 140 to function as a remote control of the device 130 and cause the device 130 to request a particular stream of media from a particular media source (e.g., media source 120). As noted above, the signal and any copies of it may be an infrared (IR) signal, a radio frequency (RF) signal, a Bluetooth signal, a wireless local area network (LAN) signal (e.g., conforming to one or more Institute of Electrical and Electronic Engineers (IEEE) 802.11 standards), a High-Definition Multimedia Interface (HDMI) signal, or any suitable combination thereof.

In various example embodiments, the signal module 460 is configured to transmit a command that, when received by the device 130, causes the device 130 to begin recording a particular stream of media from a particular media source (e.g., media source 120). The signal module 460 may transmit this command to the device 130. For example, the signal module 460 may transmit a combination of commands that cause the device 130 to change its channel (e.g., by requesting the stream of media from the media source 120) and then begin recording the new channel (e.g., by beginning to store the stream of media received from the media source 120). As another example, the signal module 460 may transmit one or more commands that cause the device 130 to wait until a particular time (e.g., Sunday at 8 PM local time) and then begin recording a particular channel (e.g., by requesting and then storing the stream of media from the media source 120).

According to some example embodiments, the signal module 460 accesses a program schedule (e.g., electronic programming guide) that indicates a name of a program (e.g., a TV show, radio program, or movie) scheduled for inclusion in a particular stream of media from a particular media source (e.g., media source 120). The program schedule may indicate a start time of the program, an end time of the program, a duration of the program, a title of the program, or any suitable combination thereof. The program schedule may be accessed from the server machine 110 (e.g., via the database 112), from the particular media source (e.g., media source 120) of the particular stream of media, from another device (e.g., device 130, device 150, or device 160), or any suitable combination thereof. The signal module 460 accordingly may transmit one or more commands, signals, or copies of signals based on the program schedule. For example, the signal module 460 may transmit one or more commands and signals to cause the device 130 to change its channel and then begin recording the new channel at a time one minute prior to the start time of a particular TV show that is scheduled for inclusion in the stream of media corresponding to the new channel.

Figure 5:
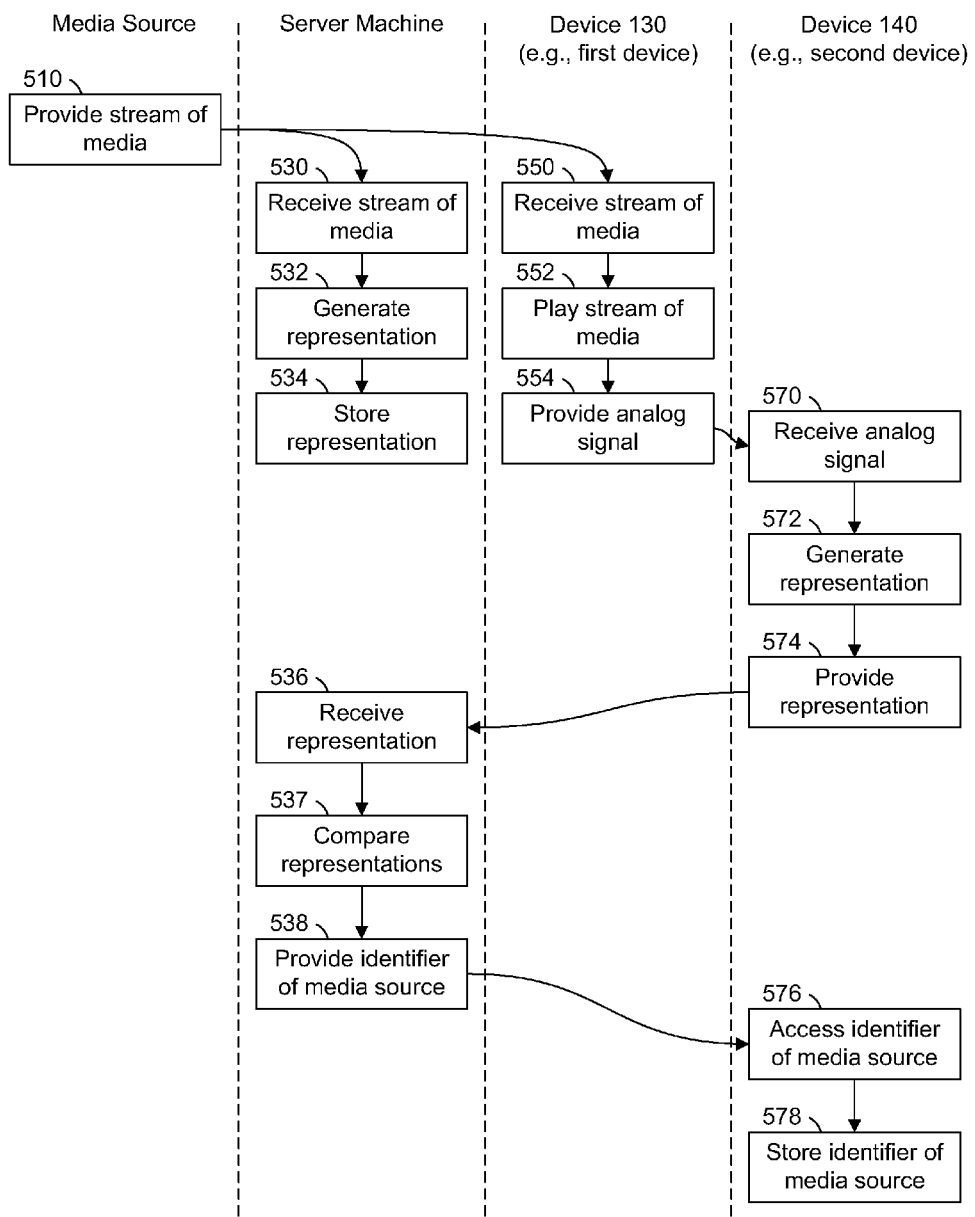
FIG. 5 is a flowchart illustrating data flows within the network environment suitable for media source identification, according to some example embodiments.

FIG. 5 is a flowchart illustrating data flows within the network environment 100, according to some example embodiments. At operation 510, the media source 120 provides a stream of media via the network 190 to the server machine 110 and to the device 130.

Considering the server machine 110, at operation 530, the server machine 110 (e.g., via the communication module 240) receives the stream of media provided by the media source 120. At operation 532, the server machine 110 (e.g., via the generator module 250) generates a representation of the stream of media received in operation 530. At operation 534, the server machine 110 (e.g., via storage module 210) stores the representation generated in operation 532.

Considering the device 130 (e.g., a first device), at operation 550, the device 130 (e.g., via the tuner 310) receives the stream of media provided by the media source 120. At operation 552, the device 130 (e.g., via the tuner 310 or other processing module of the device 130) plays the stream of media received in operation 550. At operation 554, the device 130 (e.g., via the speaker 320, the display 330, or both) provides the analog signal 134, which may be received by the device 140.

Considering the device 140 (e.g., a second device), at operation 570, the device 140 (e.g., via the reception module 410) receives the analog signal 134 from the device 130. At operation 572, the device 140 (e.g., via the generator module 420) generates a representation of the analog signal 134 received in operation 570. At operation 574, the device 140 (e.g., via the provision module 430) provides the representation generated in operation 572 to the server machine 110

Returning to consider the server machine 110, at operation 536, the server machine 110 (e.g., via the reception module 220) receives the representation of the analog signal 132, as provided by the device 140 in operation 574. In operation 537, the server machine 110 (e.g., via the provision module 230) compares the representation of the analog signal 134, as received in operation 536, with the representation of the stream of media, as generated in operation 532 and stored in operation 534. In operation 538, the server machine 110 (e.g., via the provision module 230) provides an identifier of the media source 120 to the device 140.

Returning to consider the device 140, at operation 576, the device 140 (e.g., via the access module 440) accesses the identifier of the media source 120, as provided by the server machine 110 in operation 538. At operation 578, the device 140 (e.g., via the storage module 450) stores the identifier of the media source 120 as corresponding (e.g., mapped) to the stream of media being received by the device 130, to the analog signal 134, or both. In some example embodiments, the device maps the identifier to an icon that represents the stream of media, the media source 120, or both, within a user interface of the device 140 (e.g., an array of icons or logos representing various media sources). As a result of the data flows shown in FIG. 5, the device 140 may identify the media source 120 as being the media source that is sending the stream of media to the device 130, and the device 140 may identify the media source 120 without itself receiving this stream of media.

Figure 6:
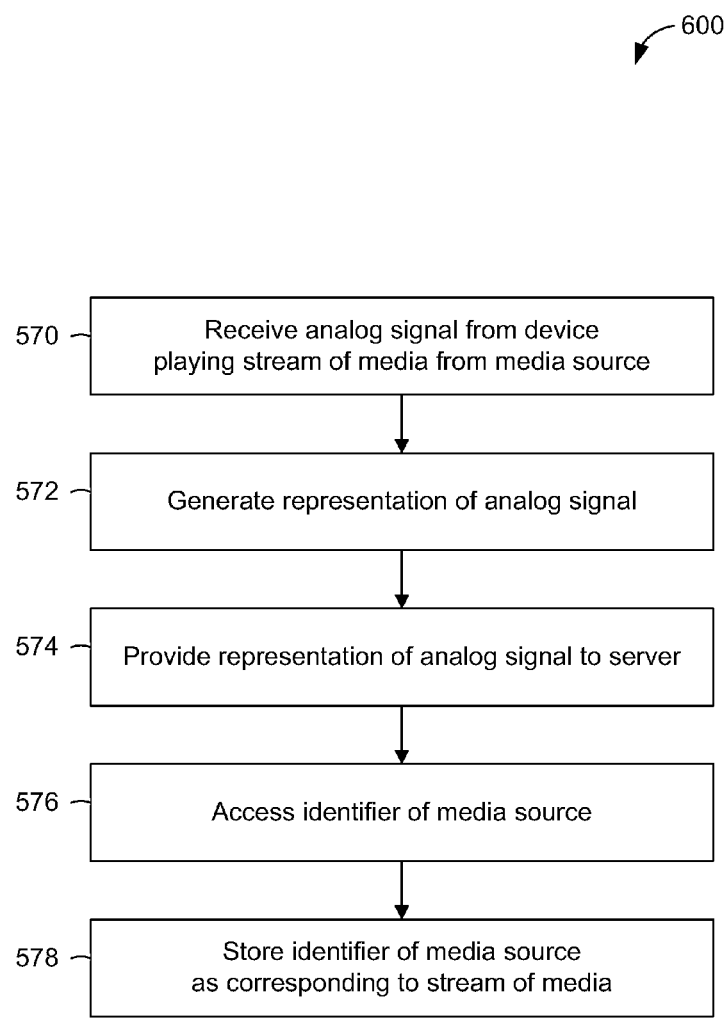
FIG. 6-8 are flowcharts illustrating operations of a device in performing a method of media source identification, according to some example embodiments.
Figure 7:
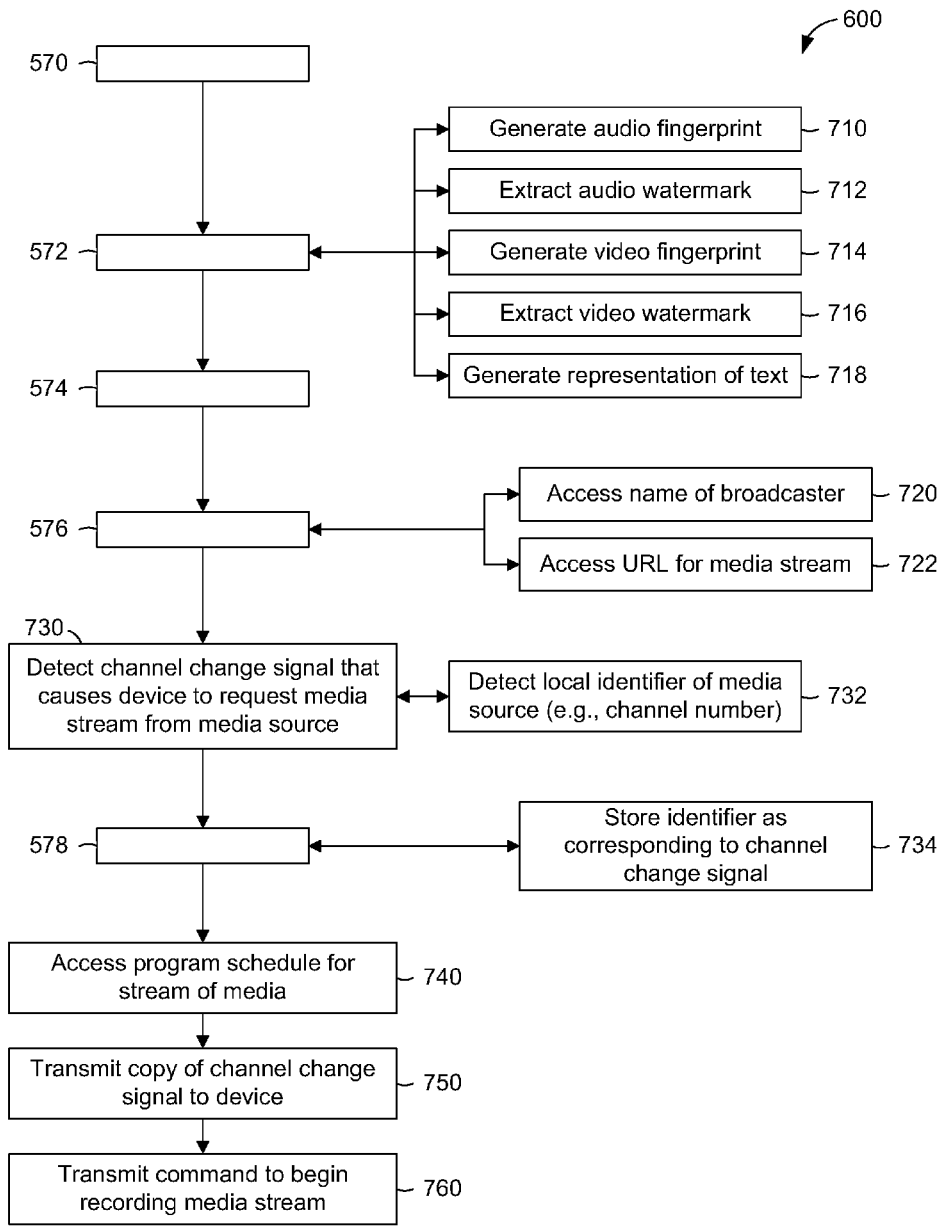
Figure 8:
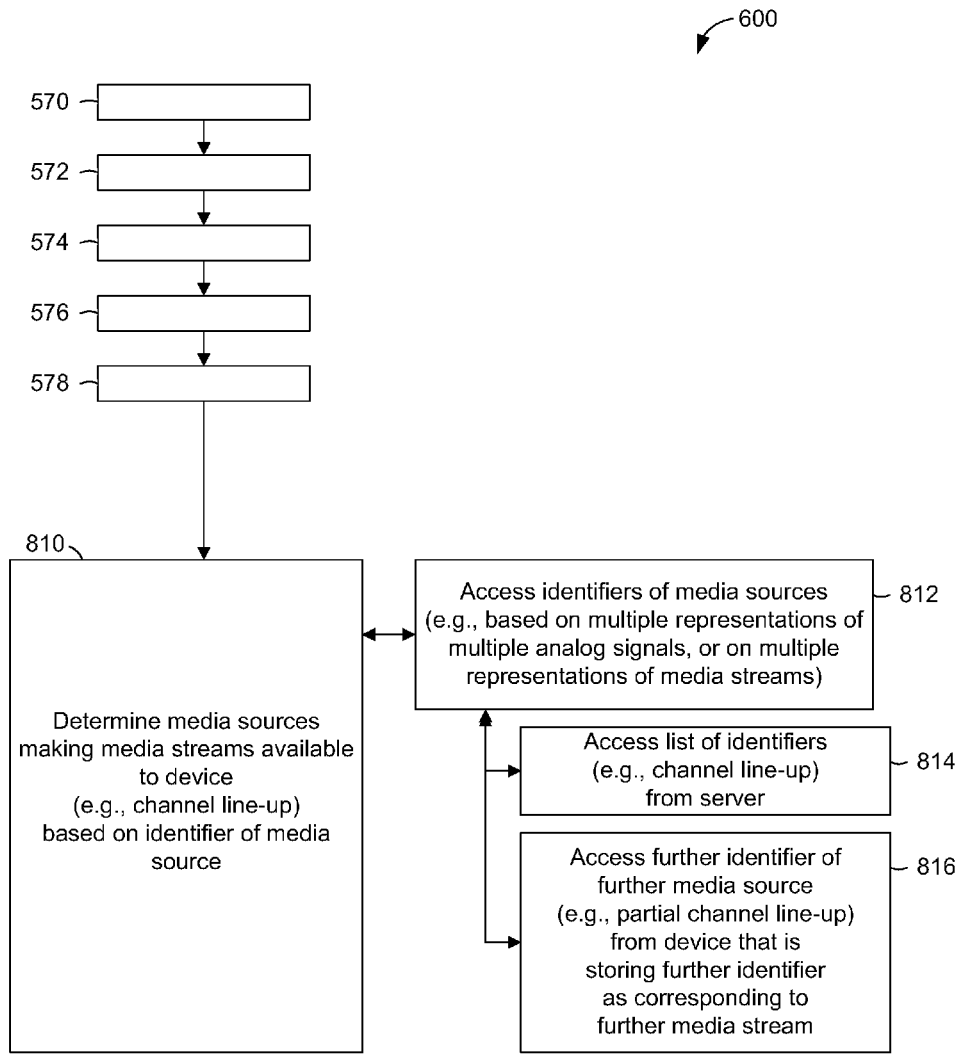

FIG. 6-8 are flowcharts illustrating operations of the device 140 in performing a method 600 of media source identification, according to some example embodiments. Operations in the method 600 may be performed by the device 140, using modules described above with respect to FIG. 3. Similar operations may be performed by the device 160, which may include modules similar to those described above with respect to FIG. 3. As shown in FIG. 6, the method 600 includes operations 570, 572, 574, 576, and 578, which were briefly described above with respect to FIG. 5.

In operation 570, the reception module 410 receives the analog signal 134 from the device 130. As noted above, the analog signal 134 may include audio information (e.g., sound or speech), video information (e.g., still images or motion pictures), text information (e.g., subtitles or closed captions), other data (e.g., an additional audio channel, an electronic program guide, an advertisement, game information, or electronic payment information), or any suitable combination thereof.

In operation 572, the generator module 420 generates a representation of the analog signal 134 or a portion thereof. As noted above, the generator module 420 may generate a representation (e.g., a fingerprint, a watermark, or a hash value) based on audio information (e.g., sound or speech), video information (e.g., still images or motion pictures), text information (e.g., subtitles or closed captions), other data (e.g., an additional audio channel, an electronic program guide, an advertisement, game information, or electronic payment information), or any suitable combination thereof, included in the analog signal 134. For example, the generator module 420 may generate the representation (e.g., an audio fingerprint or watermark) based on an acoustic waveform included in the analog signal 134. As another example, the generator module 420 may generate a representation (e.g., a video fingerprint or watermark) based on an optical pattern of light included in the analog signal 134. As a further example, the generator module 420 may generate the representation based on text (e.g., subtitles or closed captioning) included in the analog signal 134.

In operation 574, the provision module 430 provides the representation of the analog signal 134 to the server machine 110. As noted above, the server machine 110 may be storing a representation (e.g., a further representation) of the stream of media as corresponding to an identifier of the media source 120 from which the stream of media is being received by the device 130.

In operation 576, the access module 440 accesses the identifier of the media source 120 that corresponds to the stream of media being received by the device 130. The access module 440 may access the identifier in response to operation 574, or in response to an action performed by the server machine 110 in response to operation 574 (e.g., providing the identifier or providing an authorization to access the identifier), or any suitable combination thereof.

In operation 578, the storage module 450 stores an identifier of the media source 120 as corresponding to the analog signal 134, to the stream of media being received by the device 130, or both. As noted above, the storage module 450 may store the identifier within the device 140 (e.g., in memory, a disk drive, a flash drive, or other data repository within the device 140), at a data repository externally connected to the device 140 (e.g., in a cloud storage system), or any suitable combination thereof.

As shown in FIG. 7, the method 600 may include one or more of operations 710, 712, 714, 716, 718, 720, 722, 730, 732, 734, 740, 750, and 760. One or more of operations 710-718 may be performed as part (e.g., a precursor task, a subroutine, or a portion) of operation 572.

In operation 710, the analog signal 134 includes an acoustic waveform that represents sound generated by the speaker 320 of the device 130, and the generator module 420 of the device 140 generates an audio fingerprint based on the acoustic waveform. For example, the generator module 420, in performing operation 572, may generate the representation of the analog signal 134 by generating the audio fingerprint based on the acoustic waveform.

In operation 712, the analog signal 134 includes an acoustic waveform that represents sound generated by the speaker 320 of the device 130, and the generator module 420 of the device 140 extracts an audio watermark from the acoustic waveform. For example, the generator module 420, in performing operation 572, may generate the representation of the analog signal 134 by extracting the audio watermark from the acoustic waveform.

In operation 714, the analog signal 134 includes an optical pattern of light generated by the display 330 of the device 130, and the generator module 420 of the device 140 generates a video fingerprint based on the optical pattern of light. For example, the generator module 420, in performing operation 572, may generate the representation of the analog signal 134 by generating a video fingerprint based on the optical pattern of light.

In operation 716, the analog signal 134 includes an optical pattern of light generated by the display 330 of the device 130, and the generator module 420 of the device 140 extracts a video watermark from the optical pattern of light. For example, the generator module 420, in performing operation 572, may generate the representation of the analog signal 134 by extracting a video fingerprint from the optical pattern of light.

In operation 718, the analog signal 134 includes an optical pattern of light generated by the display 330 of the device 130, and the generator module 420 of the device 140 generates a representation of text (e.g., subtitles, closed captioning, or text appearing in video) appearing on the display 330. For example, the generator module 420, in performing operation 572, may generate the representation of the analog signal 134 by generating a representation of the text appearing on the display 330.

One or more of operations 720 and 722 may be performed as part (e.g., a precursor task, a subroutine, or a portion) of operation 576. In operation 720, the access module 440 of the device 140 accesses a name (e.g., "CNN") of a broadcaster (e.g., CNN®) that is broadcasting the stream of media to the device 130. For example, the access module 440, in performing operation 576, may access the identifier of the media source 120 by accessing the name of a broadcaster that is broadcasting the stream of media to the device 130.

In operation 722, the access module 440 of the device 140 accesses a URL used by the device 130 to request access to the stream of media from the media source 120 (e.g., YouTube®). For example, the access module 440, in performing operation 576, may access the identifier of the media source 120 by accessing the URL of the media source 120 that is broadcasting the stream of media to the device 130.

Some example embodiments of the method 600 include operation 730. In operation 730, the signal module 460 of the device 140 detects a signal (e.g., a control signal) that, when received by the device 130, causes the device 130 to request the stream of media from the media source 120. For example, the signal module 460 may detect a channel change signal (e.g., from a remote control) sent to control the device 130. As previously mentioned, a control signal may include a channel code (e.g., "channel 008" or "channel 220") that, when received by the device 130, causes the device 130 to change channels to a media source that corresponds to the channel code within a channel line-up (e.g., a channel line-up that is specific to a geographical region of the device 130). As noted above, such a control signal may be an IR signal, an RF signal, a Bluetooth signal, a wireless LAN signal (e.g., conforming to one or more IEEE 802.11 standards), an HDMI signal, or any suitable combination thereof.

Operation 732 may be performed as part (e.g., a precursor task, a subroutine, or a portion) of operation 730. In operation 732, the signal module 460 of the device 140 detects an identifier (e.g., a local identifier) of the media source 120. As noted above, the detected identifier may be an additional identifier (e.g., a further identifier) of the media source 120, and the detected identifier may identify the media source 120 among multiple media sources (e.g., a channel lineup) available to the device 130 (e.g., available within a geographic region of the device 130). For example, the signal module 460 may detect a local channel number (e.g., "channel 10") that corresponds to the media source 120 (e.g., CNN®).

Example embodiments of the method 600 that include operation 730 may include operation 734. In operation 734, the storage module 450 of the device 140 stores the identifier of the media source 120 that was accessed in operation 576 as corresponding to the signal (e.g., the control signal) detected in operation 730. In some example embodiments, the storage module 450 stores the identifier accessed in operation 576 as also corresponding to the additional identifier detected in operation 732.

Certain example embodiments of the method 600 include one or more of operations 740, 750, and 760. In operation 740, the signal module 460 of the device 140 accesses a program schedule (e.g., electronic programming guide) that indicates a name of a program (e.g., a TV show, radio program, or movie) scheduled for inclusion in the stream of media from the media source 120. As noted above, the program schedule may indicate a start time of the program, an end time of the program, a duration of the program, a title of the program, or any suitable combination thereof. Moreover, the program schedule may be accessed from the server machine 110 (e.g., via the database 112), from the particular media source (e.g., media source 120) of the particular stream of media, from another device (e.g., device 130, device 150, or device 160), or any suitable combination thereof.

In operation 750, the signal module 460 of the device 140 transmits a copy of the signal detected in operation 730. The copy of the signal may be transmitted to the device 130. Moreover, the copy of the signal may be transmitted based on a start time of a program scheduled for inclusion in the stream of media from the media source 120. Similarly, in some example embodiments, the copy of the signal may be transmitted based on an end time of the program.

In operation 760, the signal module 460 of the device 140 transmits a command to the device 130, where the command causes (e.g., requests) the device 130 to begin recording the media stream being provided by the media source 120. In some example embodiments, operation 730 includes detecting the command (e.g., as it is being sent from a remote control of the device 130), and operation 760 is performed by sending this detected command, or a copy of it, to the device 130.

The signal module 460 accordingly may perform one or both of operations 750 and 760 by transmitting one or more commands, signals, or copies of commands and signals based on the program schedule accessed in operation 740. For example, the signal module 460 may transmit one or more commands and signals to cause the device 130 to change its channel and then begin recording the new channel at a time one minute prior to the start time of a particular TV show that is scheduled for inclusion in the stream of media corresponding to the new channel.

As shown in FIG. 8, the method 600 may include one or more of operations 810, 812, 814, and 816. In operation 810, the storage module 450 of the device 140 determines that a set (e.g., a group) of media sources that include the media source 120 (e.g., media sources 120-128) are making available a set of streams of media to the device 130. This may have the effect of determining that a particular channel line-up is available to the device 130. In some example embodiments, the storage module 450 makes this determination based on the identifier of the media source 120 accessed in operation 576 and stored in operation 578.

Operation 810 may include operation 812. In operation 812, the storage module 450 of the device 140 accesses multiple identifiers of multiple media sources (e.g., as a partial channel line-up or as a full channel line-up). The storage module 450 may access these multiple identifiers based on multiple representations of multiple analog signals (e.g., analog signal 134), multiple representations of media streams, or any suitable combination thereof.

In some example embodiments, operation 812 includes operation 814. In operation 814, the storage module 450 of the device 140 accesses a list of the multiple identifiers of the multiple media sources discussed above with respect to operation 812. The list may be accessed from the server machine 110 (e.g., via the database 112), from another device (e.g., device 160), or any suitable combination thereof. For example, the storage module 450 may access a full channel line-up for the device 130 from the server machine 110.

In certain example embodiments, operation 812 includes operation 816. In operation 816, the storage module 450 of the device 140 accesses a subset of the multiple identifiers of the multiple media sources discussed above with respect to operation 812. The subset may be a single identifier (e.g., a further identifier) of a media source (e.g., media source 122) or may contain multiple identifiers (e.g., of media sources 122-126). The subset may be accessed from the server machine 110 (e.g., via the database 112), from another device (e.g., device 160), or any suitable combination thereof. For example, the storage module 450 may access a partial channel line-up for the device 130 from the device 160 (e.g., as information already compiled by the device 160).

Figure 9:
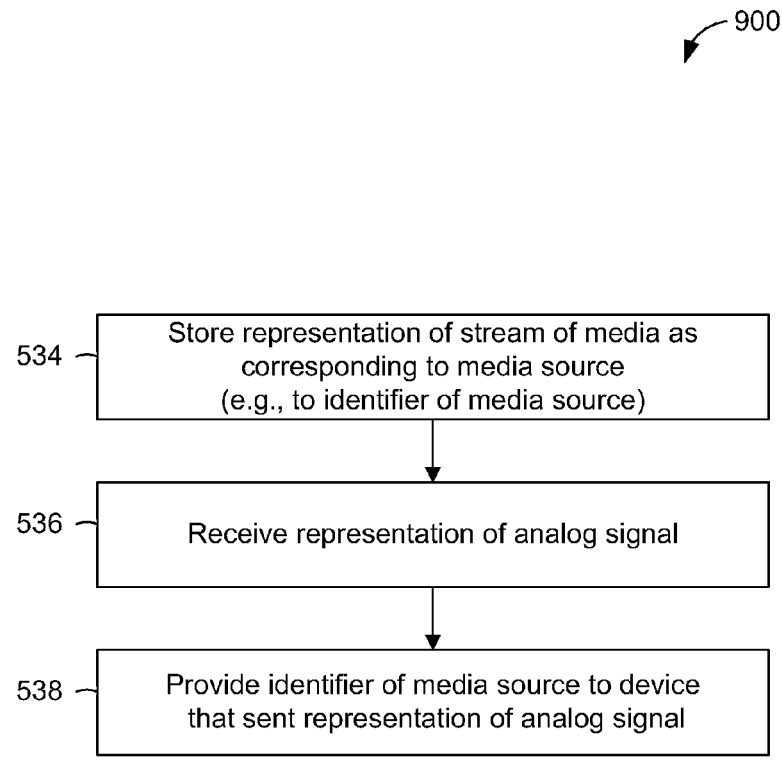
FIG. 9-10 are flowcharts illustrating operations of a server machine in performing a method of media source identification, according to some example embodiments.
Figure 10:
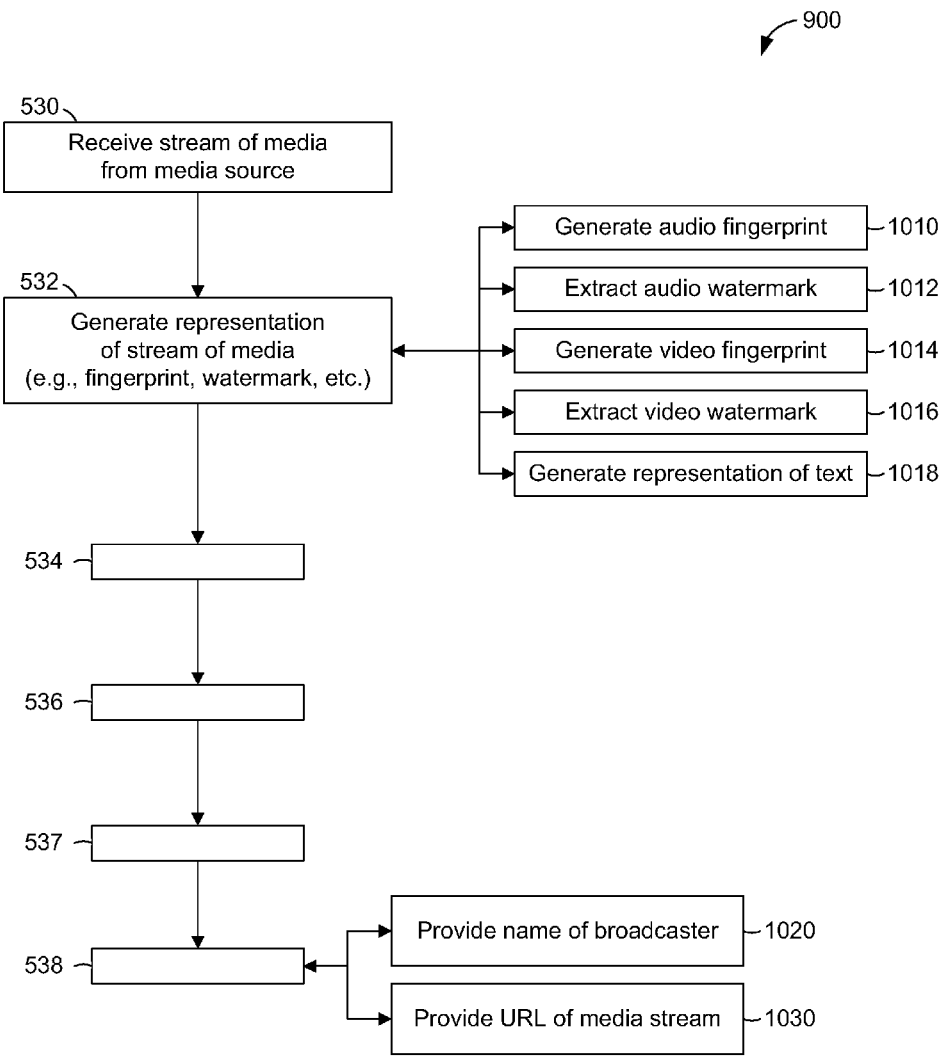

FIG. 9-10 are flowcharts illustrating operations of the server machine 110 in performing a method 900 of media source identification, according to some example embodiments. Operations in the method 900 may be performed by the server machine 110, using modules described above with respect to FIG. 2. As shown in FIG. 9, the method 900 includes operations 534, 536, and 538, which were briefly described above with respect to FIG. 5.

In operation 534, the storage module 210 of the server machine 110 stores a representation of the stream of media that is being received from the media source 120 by the device 130 (e.g., a first device). As noted above, the representation of the stream of media may be stored as corresponding to an identifier of the media source 120 from which the stream of media is being received by the device 130.

In operation 536, the reception module 220 of the server machine 110 receives a representation (e.g., a further representation) of the analog signal 134. The reception module 220 may receive the representation from the device 140 (e.g., via the provision module 430 of the device 140).

In operation 538, the provision module 230 of the server machine 110 provides the identifier of the media source 120 to the device 140 (e.g., in response to the receiving of the representation of the analog signal 134 in operation 536). In some example embodiments, the provision module 230 communicates (e.g., transmits) the identifier to the device 140. In certain example embodiments, the provision module 230 communicates an authorization (e.g., permission) to access the identifier (e.g., from the database 112) to the device 140.

As shown in FIG. 10, the method 900 may include one or more of operations 530, 532, and 537, which were briefly described above with respect to FIG. 5. Furthermore, the method 900 may include one or more of operations 1010, 1012, 1014, 1016, 1018, 1020, and 1030.

In operation 530, the communication module 240 of the server machine 110 receives a stream of media from the media source 120. The stream of media may be the same stream of media being received by the device 130 from the media source 120 (e.g., simultaneously, contemporaneously, buffered, or time delayed). In some example embodiments, the media source 120 is a broadcaster (e.g., CNN®), and the server machine 110 (e.g., via the communication module 240) initiates reception of the stream of media by accessing a broadcast transmitted from the broadcaster. In certain example embodiments, the media source 120 is a web server (e.g., YouTube®), and the server machine 110 (e.g., by the communication module 240) initiates reception of the stream of media by using a URL to request access to the stream of media.

In operation 532, the generator module 250 of the server machine 110 generates a representation of the stream of media, or a portion thereof, received in operation 530. As noted above, the representation may be generated as a fingerprint, a watermark, or a hash value based on all or part of the stream of media, or portion thereof.

In operation 537, the provision module 230 of the server machine 110 compares the representation of the stream of media from the media source 120 with the representation of the analog signal 134 from the device 140. Moreover, the provision module 230 may determine that the two representations match (e.g., exactly or within a predefined threshold of tolerance). This may have the effect of determining that the analog signal 134 was generated by the device 130 based on the same stream of media from which the server machine 110 generated the representation of the stream of media. Accordingly, the providing of the identifier in operation 538 may be performed based on the comparison performed in operation 537. In particular, the providing of the identifier in operation 538 may be performed based on the determination (e.g., that the two representations match, exactly or within a predefined threshold of tolerance) performed in operation 537.

One or more of operations 1010-1018 may be performed as part (e.g., a precursor task, a subroutine, or a portion) of operation 532, in which the generator module 250 of the server machine 110 generates a representation of the stream of media, or portion thereof, received in operation 530. In operation 1010, the stream of media from the media source 120 encodes (e.g., uses digital data to represent) an acoustic waveform that represents sound (e.g., audio content in the stream of media), and the generator module 250 of the server machine 110 generates an audio fingerprint based on the acoustic waveform encoded in the stream of media. According to various example embodiments, this acoustic waveform or a similar acoustic waveform may also be present in the analog signal 134 and may represent sound generated by the speaker 320, which is used by the device 130 in playing the stream of media from the media source 120. In some example embodiments, the generator module 250, in performing operation 532, generates the representation of the stream of media by generating the audio fingerprint based on the acoustic waveform.

In operation 1012, the stream of media from the media source 120 encodes an acoustic waveform that represents sound, and the generator module 250 of the server machine 110 extracts an audio watermark from the acoustic waveform encoded in the stream of media. According to various example embodiments, this acoustic waveform or a similar acoustic waveform may also be present in the analog signal 134 and may represent sound generated by the speaker 320, which is used by the device 130 in playing the stream of media from the media source 120. In some example embodiments, the generator module 250, in performing operation 532, generates the representation of the stream of media by extracting the audio watermark from the acoustic waveform.

In operation 1014, the stream of media from the media source 120 encodes an optical pattern of light (e.g., visual content in the stream of media), and the generator module 250 of the server machine 110 generates a video fingerprint based on the optical pattern of light encoded in the stream of media. According to various example embodiments, this optical pattern of light or a similar optical pattern of light may also be present in the analog signal 134 and may represent a picture (e.g., still images or motion picture) displayed by the display 330, which is used by the device 130 in playing the stream of media from the media source 120. In some example embodiments, the generator module 250, in performing operation 532, generates the representation of the stream of media by generating the video fingerprint based on the optical pattern of light.

In operation 1016, the stream of media from the media source 120 encodes an optical pattern of light, and the generator module 250 of the server machine 110 extracts a video watermark from the optical pattern of light encoded in the stream of media. According to various example embodiments, this optical pattern of light or a similar optical pattern of light may also be present in the analog signal 134 and may represent a picture (e.g., still images or motion picture) displayed by the display 330, which is used by the device 130 in playing the stream of media from the media source 120. In some example embodiments, the generator module 250, in performing operation 532, generates the representation of the stream of media by extracting the video watermark from the optical pattern of light.

In operation 1018, the stream of media from the media source 120 encodes an optical pattern of light that forms text (e.g., one or more alphanumeric characters), and the generator module 250 of the server machine 110 generates a representation of the text encoded in the stream of media. According to various example embodiments, this optical pattern of light or a similar optical pattern of light may also be present in the analog signal 134 and may represent a picture (e.g., still images or motion picture) displayed by the display 330, which is used by the device 130 in playing the stream of media from the media source 120. In some example embodiments, the generator module 250, in performing operation 532, generates the representation of the stream of media by generating the representation of the text.

One or both of operations 1020 and 1030 may be performed as part (e.g., a precursor task, a subroutine, or a portion) of operation 538, in which the provision module 230 of the server machine 110 provides the identifier of the media source 120 to the device 140. In operation 1020, the provision module 230 of the server machine 110 provides a name (e.g., "CNN") of a broadcaster (e.g., CNN®) that is broadcasting the stream of media to the server machine 110. For example, the provision module 230, in performing operation 538, may provide the identifier of the media source 120 by providing the name of a broadcaster that is broadcasting the stream of media to the server machine 110. Moreover, the broadcaster may be broadcasting the stream of media to the device 130 (e.g., simultaneously, contemporaneously, or time delayed). As noted above with respect to operation 537, the providing of the identifier in operation 538 may be based on a comparison of the representation of the stream of media with the representation of the analog signal 134.

In operation 1030, the provision module 230 of the server machine 110 provides a URL used by the server machine 110 to request access to the stream of media from the media source 120 (e.g., YouTube®). For example, the provision module 230, in performing operation 538, may provide the identifier of the media source 120 by providing all or part of a URL of the media source 120 that is providing access to the stream of media to the server machine 110. Moreover, the web server may be providing access to the stream of media to the device 130 (e.g., simultaneously, contemporaneously, or time delayed). As noted above with respect to operation 537, the providing of the identifier in operation 538 may be based on a comparison of the representation of the stream of media with the representation of the analog signal 134.

According to various example embodiments, one or more of the methodologies described herein may facilitate identification of a media source by a device that is not accessing a media stream from the media source. Moreover, one or more of the methodologies described herein may facilitate identification of a full or partial channel line-up that is available to a particular device or a user thereof. Hence, one or more the methodologies described herein may facilitate retrieval and presentation of information regarding the full or partial channel lineup-up, as well as enhanced remote control capabilities by the device without access to media streams from media sources over another device has access to the media streams from the media sources.

When these effects are considered in aggregate, one or more of the methodologies described herein may obviate a need for certain efforts or resources that otherwise would be involved in identifying media sources and compiling information regarding their respective media streams. Efforts expended by a user in identifying the relevant channel lineup-up for his geographic location may be reduced by one or more of the methodologies described herein. Computing resources used by one or more machines, databases, or devices (e.g., within the network environment 100) may similarly be reduced. Examples of such computing resources include processor cycles, network traffic, memory usage, data storage capacity, power consumption, and cooling capacity.

Figure 11:
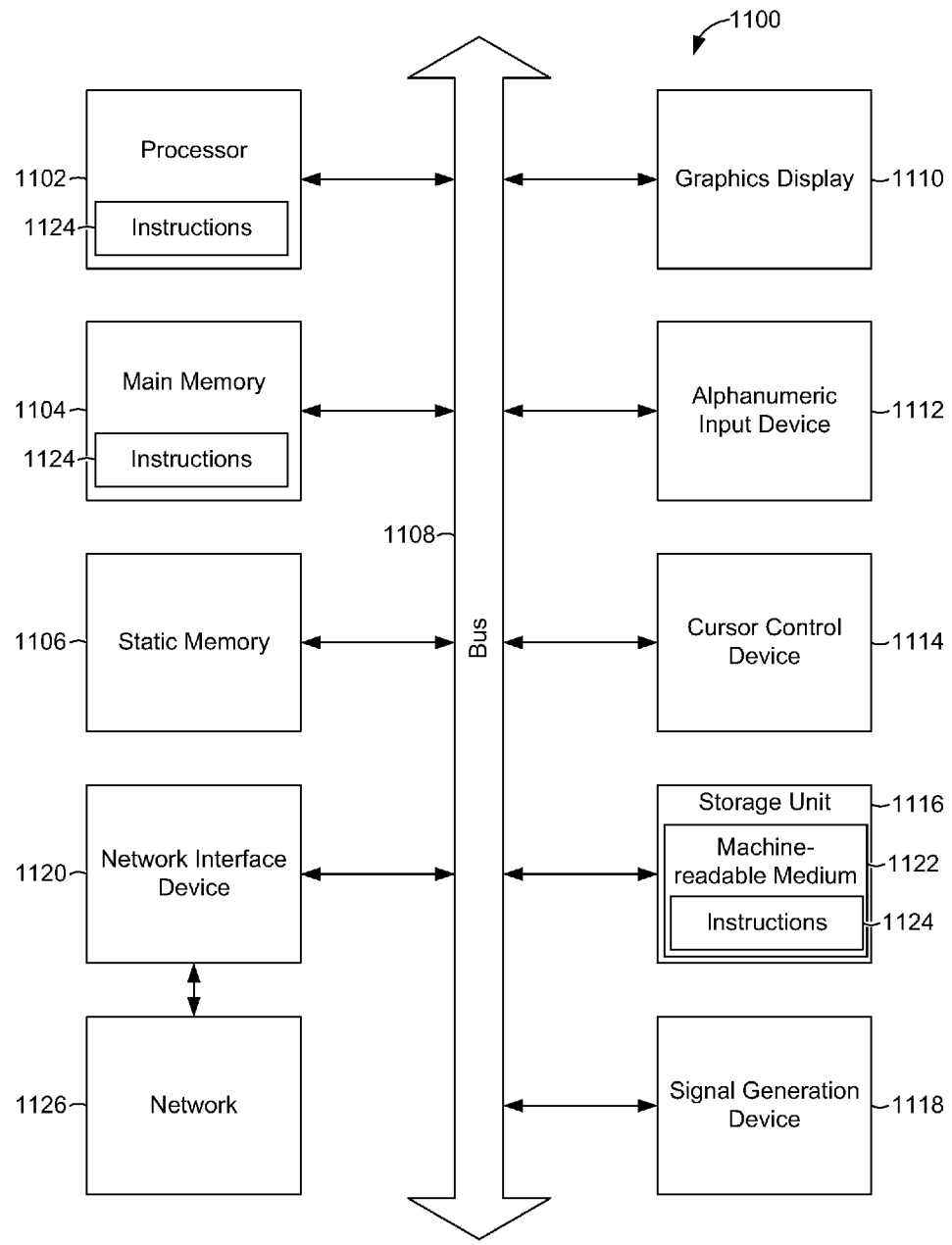
FIG. 11 is a block diagram illustrating components of a machine, according to some example embodiments, able to read instructions from a machine-readable medium and perform any one or more of the methodologies discussed herein.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system and within which instructions 1124 (e.g., software) for causing the machine 1100 to perform any one or more of the methodologies discussed herein may be executed. In alternative embodiments, the machine 1100 operates as a standalone device or may be connected (e.g., networked) to other machines. In a networked deployment, the machine 1100 may operate in the capacity of a server machine or a client machine in a server-client network environment, or as a peer machine in a peer-to-peer (or distributed) network environment. The machine 1100 may be a server computer, a client computer, a personal computer (PC), a tablet computer, a laptop computer, a netbook, an STB, a PDA, a cellular telephone, a smartphone, a web appliance, a network router, a network switch, a network bridge, or any machine capable of executing the instructions 1124 (sequentially or otherwise) that specify actions to be taken by that machine. Further, while only a single machine is illustrated, the term "machine" shall also be taken to include a collection of machines that individually or jointly execute the instructions 1124 to perform any one or more of the methodologies discussed herein.

The machine 1100 includes a processor 1102 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1104, and a static memory 1106, which are configured to communicate with each other via a bus 1108. The machine 1100 may further include a graphics display 1110 (e.g., a plasma display panel (PDP), an LED display, an LCD, a projector, or a CRT). The machine 1100 may also include an alphanumeric input device 1112 (e.g., a keyboard), a cursor control device 1114 (e.g., a mouse, a touchpad, a trackball, a joystick, a motion sensor, or other pointing instrument), a storage unit 1116, a signal generation device 1118 (e.g., a speaker), and a network interface device 1120.

The storage unit 1116 includes a machine-readable medium 1122 on which is stored the instructions 1124 (e.g., software) embodying any one or more of the methodologies or functions described herein. The instructions 1124 may also reside, completely or at least partially, within the main memory 1104, within the processor 1102 (e.g., within the processor's cache memory), or both, during execution thereof by the machine 1100. Accordingly, the main memory 1104 and the processor 1102 may be considered as machine-readable media. The instructions 1124 may be transmitted or received over a network 1126 (e.g., network 190) via the network interface device 1120.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1122 is shown in an example embodiment to be a single medium, the term "machine-readable medium" should be taken to include a single medium or multiple media (e.g., a centralized or distributed database, or associated caches and servers) able to store instructions (e.g., instructions 1124). The term "machine-readable medium" shall also be taken to include any medium that is capable of storing instructions (e.g., software) for execution by the machine, such that the instructions, when executed by one or more processors of the machine (e.g., processor 1102), cause the machine to perform any one or more of the methodologies described herein. The term "machine-readable medium" shall accordingly be taken to include, but not be limited to, a data repository in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like.

These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

The following descriptions define various example embodiments of methods and systems (e.g., apparatus) discussed herein:

1. A method comprising:
  receiving an analog signal from a device that generated the analog signal as a result of the device playing a stream of media that is being received by the device from a media source;
  generating a representation of the analog signal received from the device that is playing the stream of media,
  the generating of the representation of the analog signal being performed by a processor of a machine;
  providing the representation of the analog signal to a server that stores a further representation of the stream of media as corresponding to an identifier of the media source from which the stream of media is being received by the device;
  accessing the identifier of the media source from which the stream of media is being received by the device; and
  storing the identifier of the media source as corresponding to the stream of media being received by the device.

2. The method of description 1, wherein:
  the analog signal includes an acoustic waveform that represents sound generated by a speaker used by the device in playing the stream of media; and
  the generating of the representation of the analog signal includes generating an audio fingerprint based on the acoustic waveform.

3. The method of description 1, wherein:
  the analog signal includes an acoustic waveform that represents sound generated by a speaker used by the device in playing the stream of media; and
  the generating of the representation of the analog signal includes extracting an audio watermark from the acoustic waveform.

4. The method of description 1, wherein:
  the analog signal includes an optical pattern of light generated by a display used by the device in playing the stream of media; and
  the generating of the representation of the analog signal includes generating a video fingerprint based on the optical pattern of light.

5. The method of description 1, wherein:
  the analog signal includes an optical pattern of light generated by a display used by the device in playing the stream of media; and
  the generating of the representation of the analog signal includes extracting a video watermark from the optical pattern of light.

6. The method of description 1, wherein:
  the analog signal includes an optical pattern of light generated by a display used by the device in playing the stream of media; and
  the generating of the representation of the analog signal includes generating a representation of text appearing on the display used by the device.

7. The method of description 1, wherein:
  the accessing of the identifier of the media source includes accessing a name of a broadcaster that is broadcasting the stream of media to the device.

8. The method of description 1, wherein:
  the accessing of the identifier of the media source includes accessing a name of a television channel that corresponds to the stream of media.

9. The method of description 1, wherein:
  the accessing of the identifier of the media source includes accessing a uniform resource locator (URL) used by the device to request access to the stream of media.

10. The method of description 1 further comprising:
  detecting a further signal that, when received by the device, causes the device to request the stream of media from the media source; and wherein
  the storing of the identifier of the media source includes storing the identifier as corresponding to the further signal.

11. The method of description 10, wherein:
  the detecting of the further signal includes detecting a further identifier of the media source,
  the further identifier identifying the media source among multiple media sources available within a geographic region of the device.

12. The method of description 10 further comprising:
  transmitting a copy of the further signal to the device,
  the copy of the further signal causing the device to request the stream of media from the media source.

13. The method of description 12 further comprising:
  transmitting a command that, when received by the device, causes the device to begin recording the stream of media from the media source.

14. The method of description 12 further comprising:
  accessing a program schedule that indicates a name of a program scheduled for inclusion in the stream of media and that indicates a start time of the program; and wherein
  the transmitting of the copy of the further signal is based on the start time of the program.

15. The method of description 1, wherein:
  determining that a plurality of media sources that include the media source are making available a plurality of streams of media to the device,
  the determining being based on the identifier of the media source.

16. The method of description 15, wherein:
  the determining includes accessing multiple identifiers that correspond to the plurality of media sources,
  the accessing being based on multiple representations of multiple analog signals generated from the plurality of streams of media.

17. The method of description 16, wherein:
  the accessing of the multiple identifiers includes accessing a list of the multiple identifiers from the server.

18. The method of description 16, wherein:
  the accessing of the multiple identifiers includes accessing a further identifier of a further media source,
  the accessing of the further identifier being from a further device that is storing the further identifier as corresponding to a further stream of media.

19. The method of description 1, wherein:
the storing the identifier of the media source as corresponding to the stream of media includes mapping the identifier of the media source to an icon in a user interface.

20. A method comprising:
storing a representation of a stream of media that is being received from a media source by a first device,
the representation of the stream of media being stored as corresponding to an identifier of the media source;
receiving a further representation of an analog signal that is generated as a result of the first device playing the stream of media being received by the first device from the media source,
the receiving of the further representation being from a second device that generated the further representation of the analog signal based on the analog signal being received from the first device by the second device;
providing the identifier of the media source to the second device that generated the further representation of the analog signal and from which the further representation is received,
the providing of the identifier being performed by a processor of a machine and in response to the receiving of the further representation of the analog signal.

21. The method of description 20, wherein:
the providing of the identifier of the media source is based on a comparison of the representation with the further representation and includes providing a name of a broadcaster that is broadcasting the stream of media to the device.

22. The method of description 20, wherein:
the providing of the identifier of the media source is based on a comparison of the representation with the further representation and includes providing a uniform resource locator (URL) used by the first device to request access to the stream of media.

23. The method of description 20 further comprising:
receiving the stream of media from the media source; and
generating the representation of the stream of media.

24. The method of description 23, wherein:
the analog signal includes an acoustic waveform that represents sound generated by a speaker used by the first device in playing the stream of media;
the stream of media encodes the acoustic waveform; and
the generating of the representation of the stream of media includes generating an audio fingerprint based on the acoustic waveform encoded in the stream of media.

25. The method of description 23, wherein:
the analog signal includes an acoustic waveform that represents sound generated by a speaker used by the first device in playing the stream of media;
the stream of media encodes the acoustic waveform; and
the generating of the representation of the stream of media includes generating an audio watermark based on the acoustic waveform encoded in the stream of media.

26. The method of description 23, wherein:
the analog signal includes an optical pattern of light generated by a display used by the first device in playing the stream of media;
the stream of media encodes the optical pattern of light; and
the generating of the representation of the stream of media includes generating a video fingerprint based on the optical pattern of light encoded in the stream of media.

27. The method of description 23, wherein:
the analog signal includes an optical pattern of light generated by a display used by the first device in playing the stream of media;
the stream of media encodes the optical pattern of light; and
the generating of the representation of the stream of media includes generating a video watermark based on the optical pattern of light encoded in the stream of media.

28. A non-transitory machine-readable storage medium comprising instructions that, when executed by one or more processors of a machine, cause the machine to perform operations comprising:
receiving an analog signal from a device that generated the analog signal as a result of the device playing a stream of media that is being received by the device from a media source;
generating a representation of the analog signal received from the device that is playing the stream of media,
the generating of the representation of the analog signal being performed by the one or more processors of the machine;
providing the representation of the analog signal to a server that stores a further representation of the stream of media as corresponding to an identifier of the media source from which the stream of media is being received by the device;
accessing the identifier of the media source from which the stream of media is being received by the device; and
storing the identifier of the media source as corresponding to the stream of media being received by the device.

29. The non-transitory machine-readable storage medium of description 28, wherein:
the analog signal includes an acoustic waveform that represents sound generated by a speaker used by the device in playing the stream of media; and
the generating of the representation of the analog signal includes generating an audio fingerprint based on the acoustic waveform.

30. A non-transitory machine-readable storage medium comprising instructions that, when executed by one or more processors of a machine, cause the machine to perform operations comprising:
storing a representation of a stream of media that is being received from a media source by a first device,
the representation of the stream of media being stored as corresponding to an identifier of the media source;
receiving a further representation of an analog signal that is generated as a result of the first device playing the stream of media being received by the first device from the media source,
the receiving of the further representation being from a second device that generated the further representation of the analog signal based on the analog signal being received from the first device by the second device;
providing the identifier of the media source to the second device that generated the further representation of the analog signal and from which the further representation is received,
the providing of the identifier being performed by the one or more processors of the machine and in response to the receiving of the further representation of the analog signal.

31. The non-transitory machine-readable storage medium of description 30, wherein:
the providing of the identifier of the media source includes providing a name of a broadcaster that is broadcasting the stream of media to the first device.

32. A system comprising:
a reception module configured to receive an analog signal from a device that generated the analog signal as a result of the device playing a stream of media that is being received by the device from a media source;

a processor configured by a generator module that configures the processor to generate a representation of the analog signal received from the device that is playing the stream of media;

a provision module configured to provide the representation of the analog signal to a server that stores a further representation of the stream of media as corresponding to an identifier of the media source from which the stream of media is being received by the device;

an access module configured to access the identifier of the media source from which the stream of media is being received by the device; and a storage module configured to store the identifier of the media source as corresponding to the stream of media being received by the device.

33. The system of description 32, wherein:
the analog signal includes an acoustic waveform that represents sound generated by a speaker used by the device in playing the stream of media; and
the generator module configures the processor to generate an audio fingerprint based on the acoustic waveform.

34. A system comprising:
a storage module configured to store a representation of a stream of media that is being received from a media source by a first device,
the representation of the stream of media being stored as corresponding to an identifier of the media source;
a reception module configured to receive a further representation of an analog signal that is generated as a result of the first device playing the stream of media being received by the first device from the media source,
the receiving of the further representation being from a second device that generated the further representation of the analog signal based on the analog signal being received from the first device by the second device;
a processor configured by a provision module that configures the processor to provide the identifier of the media source to the second device that generated the further representation of the analog signal and from which the further representation is received,
the providing of the identifier being in response to the receiving of the further representation of the analog signal.

35. The system of description 34, wherein:
the provision module configures the processor to provide a name of a broadcaster that is broadcasting the stream of media to the first device.

What is claimed is:

1. A method comprising:
receiving an analog signal from a device that generated the analog signal as a result of the device playing a stream of media that is being received by the device from a media source;
generating a representation of the analog signal received from the device that is playing the stream of media, the generating of the representation of the analog signal being performed by a processor of a machine;
providing the representation of the analog signal to a server that stores a reference representation of the stream of media as corresponding to an identifier of the media source from which the stream of media is being received by the device;
accessing the identifier of the media source from which the stream of media is being received by the device, the identifier being provided by the server based on a comparison of the representation of the analog signal to the reference representation of the stream of media;

detecting a remote control code that, when the detected remote control code is received by the device, causes the device to request the stream of media from the media source; and storing the accessed identifier provided by the server as corresponding to the stream of media being received by the device and as corresponding to the detected remote control code that causes the device to request the stream of media.

2. The method of claim 1, wherein:
the analog signal includes an acoustic waveform that represents sound generated by a speaker used by the device in playing the stream of media; and
the generating of the representation of the analog signal includes generating an audio fingerprint based on the acoustic waveform.

3. The method of claim 1, wherein:
the analog signal includes an acoustic waveform that represents sound generated by a speaker used by the device in playing the stream of media; and
the generating of the representation of the analog signal includes extracting an audio watermark from the acoustic waveform.

4. The method of claim 1, wherein:
the analog signal includes an optical pattern of light generated by a display used by the device in playing the stream of media; and
the generating of the representation of the analog signal includes generating a video fingerprint based on the optical pattern of light.

5. The method of claim 1, wherein:
the analog signal includes an optical pattern of light generated by a display used by the device in playing the stream of media; and
the generating of the representation of the analog signal includes extracting a video watermark from the optical pattern of light.

6. The method of claim 1, wherein:
the analog signal includes an optical pattern of light generated by a display used by the device in playing the stream of media; and
the generating of the representation of the analog signal includes generating a representation of text appearing on the display used by the device.

7. The method of claim 1, wherein:
the accessing of the identifier of the media source includes accessing a name of a broadcaster that is broadcasting the stream of media to the device.

8. The method of claim 1, wherein:
the accessing of the identifier of the media source includes accessing a name of a television channel that corresponds to the stream of media.

9. The method of claim 1, wherein:
the accessing of the identifier of the media source includes accessing a uniform resource locator (URL) used by the device to request access to the stream of media.

10. The method of claim 1 further comprising:
transmitting a copy of the remote control code to the device, the copy of the remote control code causing the device to request the stream of media from the media source.

11. The method of claim 10 further comprising:
transmitting a command that, when received by the device, causes the device to begin recording the stream of media from the media source.

12. The method of claim 10 further comprising:
accessing a program schedule that indicates a name of a program scheduled for inclusion in the stream of media and that indicates a start time of the program; and wherein
the transmitting of the copy of the remote control code is based on the start time of the program.

13. The method of claim 1 further comprising:
determining that a plurality of media sources that include the media source are making available a plurality of streams of media to the device, the determining being based on the identifier of the media source.

14. The method of claim 13, wherein:
the determining includes accessing multiple identifiers that correspond to the plurality of media sources, the accessing being based on multiple representations of multiple analog signals generated from the plurality of streams of media.

15. The method of claim 14, wherein:
the accessing of the multiple identifiers includes accessing a list of the multiple identifiers from the server.

16. The method of claim 14, wherein:
the accessing of the multiple identifiers includes accessing a further identifier of a further media source, the accessing of the further identifier being from a further device that is storing the further identifier as corresponding to a further stream of media.

17. The method of claim 1, wherein:
the storing the identifier provided by the server as corresponding to the stream of media and as corresponding to the remote control code includes mapping the identifier of the media source to an icon in a user interface.

18. A non-transitory machine-readable storage medium comprising instructions that, when executed by one or more processors of a machine, cause the machine to perform operations comprising:
receiving an analog signal from a device that generated the analog signal as a result of the device playing a stream of media that is being received by the device from a media source;
generating a representation of the analog signal received from the device that is playing the stream of media, the generating of the representation of the analog signal being performed by the one or more processors of the machine;
providing the representation of the analog signal to a server that stores a further reference representation of the stream of media as corresponding to an identifier of the media source from which the stream of media is being received by the device;
accessing the identifier of the media source from which the stream of media is being received by the device, the identifier being provided by the server based on a comparison of the representation of the analog signal to the reference representation of the stream of media;
detecting a remote control code that, when the detected remote control code is received by the device, causes the device to request the stream of media from the media source; and
storing the accessed identifier provided by the server as corresponding to the stream of media being received by the device and as corresponding to the detected remote control code that causes the device to request the stream of media.

19. The non-transitory machine-readable storage medium of claim 18, wherein:
the analog signal includes an acoustic waveform that represents sound generated by a speaker used by the device in playing the stream of media; and
the generating of the representation of the analog signal includes generating an audio fingerprint based on the acoustic waveform.

20. A system comprising:
a reception module configured to receive an analog signal from a device that generated the analog signal as a result of the device playing a stream of media that is being received by the device from a media source;
a processor configured by a generator module that configures the processor to generate a representation of the analog signal received from the device that is playing the stream of media;
a provision module configured to provide the representation of the analog signal to a server that stores a reference representation of the stream of media as corresponding to an identifier of the media source from which the stream of media is being received by the device;
an access module configured to access the identifier of the media source from which the stream of media is being received by the device, the identifier being provided by the server based on a comparison of the representation of the analog signal to the reference representation of the stream of media;
a signal module configured to detect a remote control code that, when the detected remote control code is received by the device, causes the device to request the stream of media from the media source; and
a storage module configured to store accessed the identifier source provided by the server as corresponding to the stream of media being received by the device and as corresponding to the detected remote control code that causes the device to request the stream of media.

21. The system of claim 20, wherein:
the analog signal includes an acoustic waveform that represents sound generated by a speaker used by the device in playing the stream of media; and
the generator module configures the processor to generate an audio fingerprint based on the acoustic waveform.

* * * * *

UNITED STATES PATENT AND TRADEMARK OFFICE
CERTIFICATE OF CORRECTION

| | | |
|---|---|---|
| PATENT NO. | : 9,049,496 B2 | Page 1 of 1 |
| APPLICATION NO. | : 13/224172 | |
| DATED | : June 2, 2015 | |
| INVENTOR(S) | : Raesig et al. | |

It is certified that error appears in the above-identified patent and that said Letters Patent is hereby corrected as shown below:

Specification

In column 11, line 20, delete "430" and insert --460--, therefor

In column 12, line 48, delete "110" and insert --110.--, therefor

In column 12, line 51, delete "132," and insert --134,--, therefor

Signed and Sealed this
Tenth Day of November, 2015

Michelle K. Lee
*Director of the United States Patent and Trademark Office*